US012250456B2

(12) United States Patent
Liu et al.

(10) Patent No.: US 12,250,456 B2
(45) Date of Patent: Mar. 11, 2025

(54) VIDEO PROCESSING METHOD AND ELECTRONIC DEVICE

(71) Applicant: BEIJING HONOR DEVICE CO., LTD., Beijing (CN)

(72) Inventors: Zhenyi Liu, Beijing (CN); Jianyong Xuan, Beijing (CN); Guozhi Cao, Beijing (CN)

(73) Assignee: Beijing Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/252,907

(22) PCT Filed: Sep. 6, 2022

(86) PCT No.: PCT/CN2022/117323
§ 371 (c)(1),
(2) Date: May 15, 2023

(87) PCT Pub. No.: WO2023/124200
PCT Pub. Date: Jul. 6, 2023

(65) Prior Publication Data
US 2024/0357231 A1 Oct. 24, 2024

(30) Foreign Application Priority Data

Dec. 27, 2021 (CN) .......................... 202111636357.5
Mar. 29, 2022 (CN) .......................... 202210320689.0

(51) Int. Cl.
*H04N 23/667* (2023.01)
*G10L 15/08* (2006.01)
(Continued)

(52) U.S. Cl.
CPC ........... *H04N 23/667* (2023.01); *G10L 15/08* (2013.01); *G10L 15/22* (2013.01); *G10L 21/028* (2013.01);
(Continued)

(58) Field of Classification Search
CPC .... H04N 23/667; H04N 23/632; H04N 23/90; H04N 23/62; H04N 23/6812;
(Continued)

(56) References Cited

U.S. PATENT DOCUMENTS

2010/0063807 A1  3/2010  Archibald et al.
2013/0222521 A1* 8/2013  Lee ...................... H04N 7/147
                                                       348/14.02

FOREIGN PATENT DOCUMENTS

CN      105306815 A      2/2016
CN      105681660 A      6/2016
(Continued)

*Primary Examiner* — Usman A Khan
(74) *Attorney, Agent, or Firm* — Fish & Richardson P.C.

(57) ABSTRACT

A video processing method and an electronic device, wherein the method includes: running a camera application program on an electronic device; displaying a first image, where the first image is an image captured when the electronic device is in a first shooting mode; obtaining audio data, where the audio data is data captured by the at least two pickup apparatuses; obtaining a switching instruction based on the audio data, where the switching instruction is used to instruct the electronic device to switch from the first shooting mode to a second shooting mode; and displaying a second image, where the second image is an image captured when the electronic device is in the second shooting mode. Based on the technical solution of this application, video recording can be completed without requiring a user to switch shooting modes of the electronic device, thereby improving shooting experience of the user.

20 Claims, 14 Drawing Sheets

(51) Int. Cl.
  *G10L 15/22* (2006.01)
  *G10L 21/028* (2013.01)
  *G10L 25/18* (2013.01)
  *G10L 25/21* (2013.01)
  *G10L 25/78* (2013.01)
  *H04N 23/63* (2023.01)
  *H04N 23/90* (2023.01)
  *H04R 1/02* (2006.01)
  *H04R 1/40* (2006.01)
  *H04R 3/00* (2006.01)

(52) U.S. Cl.
  CPC .............. *G10L 25/18* (2013.01); *G10L 25/21* (2013.01); *G10L 25/78* (2013.01); *H04N 23/632* (2023.01); *H04N 23/90* (2023.01); *H04R 1/028* (2013.01); *H04R 1/406* (2013.01); *H04R 3/005* (2013.01); *G10L 2015/088* (2013.01); *H04R 2499/11* (2013.01)

(58) Field of Classification Search
  CPC ...... H04N 23/631; H04N 23/45; G10L 15/08; G10L 15/22; G10L 21/028; G10L 25/18; G10L 25/21; G10L 25/78; G10L 2015/088; H04R 1/028; H04R 1/406; H04R 3/005; H04R 2499/11
  USPC ...................................................... 348/333.05
  See application file for complete search history.

(56) References Cited

FOREIGN PATENT DOCUMENTS

| | | |
|---|---|---|
| CN | 106303260 A | 1/2017 |
| CN | 108073381 A | 5/2018 |
| CN | 113422903 A | 9/2021 |
| JP | 2007312039 A | 11/2007 |
| WO | 2019241920 A1 | 12/2019 |

* cited by examiner

VIDEO PROCESSING METHOD AND ELECTRONIC DEVICE

CROSS-REFERENCE TO RELATED APPLICATIONS

This application is a national stage of International Application No. PCT/CN2022/117323, filed on Sep. 6, 2022, which claims priority to Chinese Patent Application No. 202111636357.5, filed on Dec. 27, 2021, and Chinese Patent Application No. 202210320689.0, filed on Mar. 29, 2022. The disclosures of the aforementioned applications are hereby incorporated by reference in their entireties.

TECHNICAL FIELD

This application relates to the video processing field, and specifically, to a video processing method and an electronic device.

BACKGROUND

In a video recording scenario or a video call scenario, an electronic device often faces a requirement for camera switching, and needs to switch a shooting mode, for example, switch between a front camera and a back camera, or switch between multi-camera video recording or single-camera video recording. Currently, camera switching of the electronic device depends on a user's manual operation. Therefore, the photographer needs to be close to the electronic device in a shooting process. If the user is far away from the electronic device, camera switching of the electronic device needs to be implemented based on a Bluetooth technology. When camera switching of the electronic device is implemented based on the Bluetooth technology, a corresponding operation needs to be performed on a camera of the electronic device by using a control device. On one hand, the operation is complex. On the other hand, the control device is likely to be exposed in a video, and an aesthetic feeling of the video is affected, resulting in poor user experience.

Therefore, how an electronic device automatically performs camera switching based on a user requirement in a video scenario has become an urgent problem to be resolved.

SUMMARY

This application provides a video processing method and an electronic device, to complete video recording without requiring a user to switch a shooting mode of the electronic device, thereby improving shooting experience of the user.

According to a first aspect, a video processing method is provided and applied to an electronic device, where the electronic device includes at least two pickup apparatuses, and the video processing method includes:
  running a camera application program on the electronic device;
  displaying a first image, where the first image is an image captured when the electronic device is in a first shooting mode;
  obtaining audio data, where the audio data is data captured by the at least two pickup apparatuses;
  obtaining a switching instruction based on the audio data, where the switching instruction is used to instruct the electronic device to switch from the first shooting mode to a second shooting mode; and
  displaying a second image, where the second image is an image captured when the electronic device is in the second shooting mode.

In this embodiment of this application, the electronic device can capture the audio data in a shooting environment by using the at least two pickup apparatuses (for example, microphones); and the electronic device generates the switching instruction based on the audio data, automatically switches from the current first shooting mode to the second shooting mode based on the switching instruction, and displays the second image captured in the second shooting mode. Without requiring a user to switch shooting modes of the electronic device, the electronic device can automatically switch shooting modes to complete video recording, thereby improving shooting experience of the user.

It should be understood that in this embodiment of this application, because the electronic device needs to determine directivity of the audio data, the electronic device in this embodiment of this application includes the at least two pickup apparatuses, but a specific quantity of pickup apparatuses is not limited.

In a possible implementation, the first shooting mode may be either of a single-shooting mode and a multi-shooting mode, where the single-shooting mode may include a front single-shooting mode or a back single-shooting mode; and the multi-shooting mode may include a front/back dual-shooting mode, a back/front dual-shooting mode, a picture-in-picture front main picture mode, or a picture-in-picture back main picture mode.

For example, in the front single-shooting mode, one front camera in the electronic device is used for video shooting; in the back single-shooting mode, one back camera in the electronic device is used for video shooting; in the front/back dual-shooting mode, one front camera and one back camera are used for video shooting; in the picture-in-picture front mode, one front camera and one back camera are used for video shooting, a picture shot by the back camera is placed in a picture shot by the front camera, and the picture shot by the front camera is a main picture; or in the picture-in-picture back mode, one front camera and one back camera are used for video shooting, a picture shot by the front camera is placed in a picture shot by the back camera, and the picture shot by the back camera is a main picture.

Optionally, the multi-shooting mode may further include a front dual-shooting mode, a back dual-shooting mode, a front picture-in-picture mode, a back picture-in-picture mode, or the like.

It should be understood that the first shooting mode and the second shooting mode may be the same shooting mode or different shooting modes. If the switching instruction is a default current shooting mode, the second shooting mode and the first shooting mode may be the same shooting mode. In other cases, the second shooting mode and the first shooting mode may be different shooting modes.

With reference to the first aspect, in some implementations of the first aspect, the electronic device includes a first camera and a second camera, the first camera and the second camera are located in different directions of the electronic device, and the obtaining a switching instruction based on the audio data includes:
  recognizing whether the audio data includes a target keyword, where the target keyword is text information corresponding to the switching instruction;
  in a case that the target keyword is recognized in the audio data, obtaining the switching instruction based on the target keyword;

in a case that the target keyword is not recognized in the audio data, processing the audio data to obtain audio data in a first direction and/or audio data in a second direction, where the first direction is used to indicate a first preset angle range corresponding to the first camera, and the second direction is used to indicate a second preset angle range corresponding to the second camera; and obtaining the switching instruction based on the audio data in the first direction and/or the audio data in the second direction.

In this embodiment of this application, whether the audio data includes the target keyword may be recognized first. If the audio data includes the target keyword, the electronic device switches the shooting mode to the second shooting mode corresponding to the target keyword. If the audio data does not include the target keyword, the electronic device may obtain the switching instruction based on the audio data in the first direction and/or the audio data in the second direction. For example, if the user is in front of the electronic device, a front camera is usually used to capture an image. If there is audio information of the user in a front direction of the electronic device, it may be considered that the user is in the front direction of the electronic device, and the front camera may be turned on in this case. If the user is behind the electronic device, a back camera is usually used to capture an image. If there is audio information of the user in a back direction of the electronic device, it may be considered that the user is in the back direction of the electronic device, and the back camera may be turned on in this case.

With reference to the first aspect, in some implementations of the first aspect, the processing the audio data to obtain audio data in a first direction and/or audio data in a second direction includes:

processing the audio data based on a sound direction probability calculation algorithm to obtain the audio data in the first direction and/or the audio data in the second direction.

In this embodiment of this application, a probability of audio data in each direction may be calculated, so that audio data in various directions is separated and that the audio data in the first direction and the audio data in the second direction are obtained; the switching instruction may be obtained based on the audio data in the first direction and/or the audio data in the second direction; and the electronic device can automatically switch shooting modes based on the switching instruction.

With reference to the first aspect, in some implementations of the first aspect, the obtaining the switching instruction based on the audio data in the first direction and/or the audio data in the second direction includes:

obtaining the switching instruction based on energy of a first amplitude spectrum and/or energy of a second amplitude spectrum, where the first amplitude spectrum is an amplitude spectrum of the audio data in the first direction, and the second amplitude spectrum is an amplitude spectrum of the audio data in the second direction.

It should be understood that in a video recording scenario, usually, a direction in which energy of audio data is greater (for example, a direction in which volume of audio information is greater) may be considered as a main shooting direction. The main shooting direction may be obtained based on energy of amplitude spectra of audio data in different directions. For example, if the energy of the amplitude spectrum of the audio data in the first direction is greater than the energy of the amplitude spectrum of the audio data in the second direction, the first direction may be considered as the main shooting direction. In this case, a camera corresponding to the first direction in the electronic device can be turned on.

With reference to the first aspect, in some implementations of the first aspect, the switching instruction includes a current shooting mode, a first picture-in-picture mode, a second picture-in-picture mode, a first dual-view mode, a second dual-view mode, a single-shooting mode of the first camera, or a single-shooting mode of the second camera, and the obtaining the switching instruction based on energy of a first amplitude spectrum and/or energy of a second amplitude spectrum includes:

if the energy of the first amplitude spectrum and the energy of the second amplitude spectrum are both less than a first preset threshold, the obtained switching instruction is to maintain the current shooting mode;

if the energy of the first amplitude spectrum is greater than a second preset threshold, and the energy of the second amplitude spectrum is less than or equal to the second preset threshold, the switching instruction is to switch to the single-shooting mode of the first camera;

if the energy of the second amplitude spectrum is greater than a second preset threshold, and the energy of the first amplitude spectrum is less than or equal to the second preset threshold, the switching instruction is to switch to the single-shooting mode of the second camera;

if the energy of the first amplitude spectrum is greater than a second preset threshold, and the energy of the second amplitude spectrum is greater than or equal to a first preset threshold, the switching instruction is to switch to the first picture-in-picture mode;

if the energy of the second amplitude spectrum is greater than a second preset threshold, and the energy of the first amplitude spectrum is greater than or equal to a first preset threshold, the switching instruction is to switch to the second picture-in-picture mode;

if the energy of the first amplitude spectrum and the energy of the second amplitude spectrum are both greater than or equal to a second preset threshold, and the energy of the first amplitude spectrum is greater than the energy of the second amplitude spectrum, the switching instruction is to switch to the first dual-view mode; or if the energy of the first amplitude spectrum and the energy of the second amplitude spectrum are both greater than or equal to a second preset threshold, and the energy of the second amplitude spectrum is greater than the energy of the first amplitude spectrum, the switching instruction is to switch to the second dual-view mode, where the second preset threshold is greater than the first preset threshold, the first picture-in-picture mode is a shooting mode in which an image captured by the first camera is a main picture, the second picture-in-picture mode is a shooting mode in which an image captured by the second camera is a main picture, the first dual-view mode is a shooting mode in which the image captured by the first camera is located on an upper or left side of a display of the electronic device, and the second dual-view mode is a shooting mode in which the image captured by the second camera is located on the upper or left side of the display of the electronic device.

With reference to the first aspect, in some implementations of the first aspect, the first amplitude spectrum is a first average amplitude spectrum obtained by averaging amplitude spectra corresponding to all frequencies in the audio data in the first direction; and/or
the second amplitude spectrum is a second average amplitude spectrum obtained by averaging amplitude spectra corresponding to all frequencies in the audio data in the second direction.

In this embodiment of this application, the amplitude spectrum obtained by averaging the amplitude spectra of different frequencies in the audio data in the first direction may be referred to as the first average amplitude spectrum; and the amplitude spectrum obtained by averaging the amplitude spectra of different frequencies in the audio data in the second direction may be referred to as the second average amplitude spectrum. Because the first average amplitude spectrum and/or the second average amplitude spectrum are/is the amplitude spectrum obtained by averaging the amplitude spectra of different frequencies, accuracy of the audio data in the first direction and/or accuracy of information in the audio data in the first direction can be improved.

With reference to the first aspect, in some implementations of the first aspect, the first amplitude spectrum is an amplitude spectrum obtained after first amplification processing and/or second amplification processing are/is performed on a first average amplitude spectrum, and the first average amplitude spectrum is obtained by averaging amplitude spectra corresponding to all frequencies in the audio data in the first direction.

With reference to the first aspect, in some implementations of the first aspect, the video processing method further includes:
performing voice detection on the audio data in the first direction to obtain a first detection result;
estimating a direction of arrival of the data captured by the at least two pickup apparatuses to obtain angle prediction information; and
if the first detection result indicates that the audio data in the first direction includes audio information of a user, performing the first amplification processing on the amplitude spectrum of the audio data in the first direction; and/or
if the angle prediction information includes angle information within the first preset angle range, performing the second amplification processing on the amplitude spectrum of the audio data in the first direction.

With reference to the first aspect, in some implementations of the first aspect, the second amplitude spectrum is an amplitude spectrum obtained after first amplification processing and/or second amplification processing are/is performed on a second average amplitude spectrum, and the second average amplitude spectrum is obtained by averaging amplitude spectra corresponding to all frequencies in the audio data in the second direction.

With reference to the first aspect, in some implementations of the first aspect, the video processing method further includes:
performing voice detection on the audio data in the second direction to obtain a second detection result;
estimating a direction of arrival of the data captured by the at least two pickup apparatuses to obtain angle prediction information; and
if the second detection result indicates that the audio data in the second direction includes audio information of a user, performing the first amplification processing on the amplitude spectrum of the audio data in the second direction; and/or
if the angle prediction information includes angle information within the second preset angle range, performing the second amplification processing on the amplitude spectrum of the audio data in the second direction.

It should be understood that in the video recording scenario, usually, a direction in which the user is located may be considered as the main shooting direction. If the detection result indicates that the direction includes the audio information of the user, it may be considered that the user is in the direction. In this case, the first amplification processing may be performed on the audio data in this direction, and accuracy of the obtained audio information of the user can be improved through the first amplification processing.

Direction-of-arrival estimation is an algorithm that estimates a direction of arrival of a signal by performing a spatial Fourier transform on the received signal and then taking a square of a modulus to obtain a spatial spectrum.

It should be understood that in the video recording scenario, usually, the direction in which the user is located may be considered as the main shooting direction. If the detection result indicates that the direction includes the audio information of the user, it may be considered that the user is in the direction. In this case, the first amplification processing may be performed on the audio data in this direction, and accuracy of the obtained audio information of the user can be improved through the first amplification processing. When the angle prediction information includes the first preset angle range and/or the second preset angle range, it may indicate that there is audio information in the first direction and/or the second direction of the electronic device; accuracy of the first amplitude spectrum or the second amplitude spectrum can be improved through the second amplification processing; and the switching instruction can be accurately obtained while accuracy of the amplitude spectrum and the audio information of the user is improved.

With reference to the first aspect, in some implementations of the first aspect, the recognizing whether the audio data includes a target keyword includes:
performing separation processing on the audio data based on a blind signal separation algorithm to obtain N pieces of audio information, where the N pieces of audio information are audio information of different users; and
recognizing each of the N pieces of audio information to determine whether the N pieces of audio information include the target keyword.

In this embodiment of this application, separation processing may be first performed on the audio data captured by the at least two pickup apparatuses to obtain the N pieces of audio information of different sources; and whether the target keyword is included is recognized in each of the N pieces of audio information. Therefore, accuracy of recognizing the target keyword can be improved.

With reference to the first aspect, in some implementations of the first aspect, the first image is a preview image captured when the electronic device is in multi-camera video recording.

With reference to the first aspect, in some implementations of the first aspect, the first image is a video picture captured when the electronic device is in multi-camera video recording.

With reference to the first aspect, in some implementations of the first aspect, the audio data is data captured by the pickup apparatuses in a shooting environment in which the electronic device is located.

According to a second aspect, an electronic device is provided. The electronic device includes one or more processors, a memory, and at least two pickup apparatuses, where the memory is coupled to the one or more processors, the memory is configured to store computer program code, the computer program code includes computer instructions, and the one or more processors invoke the computer instructions to enable the electronic device to perform the following:

running a camera application program on the electronic device;

displaying a first image, where the first image is an image captured when the electronic device is in a first shooting mode;

obtaining audio data, where the audio data is data captured by the at least two pickup apparatuses;

obtaining a switching instruction based on the audio data, where the switching instruction is used to instruct the electronic device to switch from the first shooting mode to a second shooting mode; and displaying a second image, where the second image is an image captured when the electronic device is in the second shooting mode.

With reference to the second aspect, in some implementations of the second aspect, the electronic device includes a first camera and a second camera, the first camera and the second camera are located in different directions of the electronic device, and the one or more processors invoke the computer instructions to enable the electronic device to perform the following:

recognizing whether the audio data includes a target keyword, where the target keyword is text information corresponding to the switching instruction;

in a case that the target keyword is recognized in the audio data, obtaining the switching instruction based on the target keyword;

in a case that the target keyword is not recognized in the audio data processing the audio data to obtain audio data in a first direction and/or audio data in a second direction, where the first direction is used to indicate a first preset angle range corresponding to the first camera, and the second direction is used to indicate a second preset angle range corresponding to the second camera; and obtaining the switching instruction based on the audio data in the first direction and/or the audio data in the second direction.

With reference to the second aspect, in some implementations of the second aspect, the processing the audio data to obtain audio data in a first direction and/or audio data in a second direction includes:

processing the audio data based on a sound direction probability calculation algorithm to obtain the audio data in the first direction and/or the audio data in the second direction.

With reference to the second aspect, in some implementations of the second aspect, the one or more processors invoke the computer instructions to enable the electronic device to perform the following:

obtaining the switching instruction based on energy of a first amplitude spectrum and/or energy of a second amplitude spectrum, where the first amplitude spectrum is an amplitude spectrum of the audio data in the first direction, and the second amplitude spectrum is an amplitude spectrum of the audio data in the second direction.

With reference to the second aspect, in some implementations of the second aspect, the switching instruction includes a current shooting mode, a first picture-in-picture mode, a second picture-in-picture mode, a first dual-view mode, a second dual-view mode, a single-shooting mode of the first camera, or a single-shooting mode of the second camera, and the one or more processors invoke the computer instructions to enable the electronic device to perform the following:

if the energy of the first amplitude spectrum and the energy of the second amplitude spectrum are both less than a first preset threshold, the obtained switching instruction is to maintain the current shooting mode;

if the energy of the first amplitude spectrum is greater than a second preset threshold, and the energy of the second amplitude spectrum is less than or equal to the second preset threshold, the switching instruction is to switch to the single-shooting mode of the first camera;

if the energy of the second amplitude spectrum is greater than a second preset threshold, and the energy of the first amplitude spectrum is less than or equal to the second preset threshold, the switching instruction is to switch to the single-shooting mode of the second camera;

if the energy of the first amplitude spectrum is greater than a second preset threshold, and the energy of the second amplitude spectrum is greater than or equal to a first preset threshold, the switching instruction is to switch to the first picture-in-picture mode;

if the energy of the second amplitude spectrum is greater than a second preset threshold, and the energy of the first amplitude spectrum is greater than or equal to a first preset threshold, the switching instruction is to switch to the second picture-in-picture mode;

if the energy of the first amplitude spectrum and the energy of the second amplitude spectrum are both greater than or equal to a second preset threshold, and the energy of the first amplitude spectrum is greater than the energy of the second amplitude spectrum, the switching instruction is to switch to the first dual-view mode; or if the energy of the first amplitude spectrum and the energy of the second amplitude spectrum are both greater than or equal to a second preset threshold, and the energy of the second amplitude spectrum is greater than the energy of the first amplitude spectrum, the switching instruction is to switch to the second dual-view mode, where the second preset threshold is greater than the first preset threshold, the first picture-in-picture mode is a shooting mode in which an image captured by the first camera is a main picture, the second picture-in-picture mode is a shooting mode in which an image captured by the second camera is a main picture, the first dual-view mode is a shooting mode in which the image captured by the first camera is located on an upper or left side of a display of the electronic device, and the second dual-view mode is a shooting mode in which the image captured by the second camera is located on the upper or left side of the display of the electronic device.

With reference to the second aspect, in some implementations of the second aspect, the first amplitude spectrum is a first average amplitude spectrum obtained by averaging amplitude spectra corresponding to all frequencies in the audio data in the first direction; and/or the second amplitude spectrum is a second average amplitude spectrum obtained by averaging amplitude spectra corresponding to all frequencies in the audio data in the second direction.

With reference to the second aspect, in some implementations of the second aspect, the first amplitude spectrum is an amplitude spectrum obtained after first amplification processing and/or second amplification processing are/is performed on a first average amplitude spectrum, and the first average amplitude spectrum is obtained by averaging amplitude spectra corresponding to all frequencies in the audio data in the first direction.

With reference to the second aspect, in some implementations of the second aspect, the one or more processors invoke the computer instructions to enable the electronic device to perform the following:

performing voice detection on the audio data in the first direction to obtain a first detection result;

estimating a direction of arrival of the data captured by the at least two pickup apparatuses to obtain angle prediction information; and if the first detection result indicates that the audio data in the first direction includes audio information of a user, performing the first amplification processing on the amplitude spectrum of the audio data in the first direction; and/or if the angle prediction information includes angle information within the first preset angle range, performing the second amplification processing on the amplitude spectrum of the audio data in the first direction.

With reference to the second aspect, in some implementations of the second aspect, the second amplitude spectrum is an amplitude spectrum obtained after first amplification processing and/or second amplification processing are/is performed on a second average amplitude spectrum, and the second average amplitude spectrum is obtained by averaging amplitude spectra corresponding to all frequencies in the audio data in the second direction.

With reference to the second aspect, in some implementations of the second aspect, the one or more processors invoke the computer instructions to enable the electronic device to perform the following:

performing voice detection on the audio data in the second direction to obtain a second detection result;

estimating a direction of arrival of the data captured by the at least two pickup apparatuses to obtain angle prediction information; and if the second detection result indicates that the audio data in the second direction includes audio information of a user, performing the first amplification processing on the amplitude spectrum of the audio data in the second direction; and/or if the angle prediction information includes angle information within the second preset angle range, performing the second amplification processing on the amplitude spectrum of the audio data in the second direction.

With reference to the second aspect, in some implementations of the second aspect, the one or more processors invoke the computer instructions to enable the electronic device to perform the following:

performing separation processing on the audio data based on a blind signal separation algorithm to obtain N pieces of audio information, where the N pieces of audio information are audio information of different users; and recognizing each of the N pieces of audio information to determine whether the N pieces of audio information include the target keyword.

With reference to the second aspect, in some implementations of the second aspect, the first image is a preview image captured when the electronic device is in multi-camera video recording.

With reference to the second aspect, in some implementations of the second aspect, the first image is a video picture captured when the electronic device is in multi-camera video recording.

With reference to the second aspect, in some implementations of the second aspect, the audio data is data captured by the pickup apparatuses in a shooting environment in which the electronic device is located.

According to a third aspect, an electronic device is provided and includes a module/unit configured to perform the video processing method according to the first aspect or any implementation of the first aspect.

According to a fourth aspect, an electronic device is provided. The electronic device includes one or more processors and a memory, where the memory is coupled to the one or more processors, the memory is configured to store computer program code, the computer program code includes computer instructions, and the one or more processors invoke the computer instructions to enable the electronic device to perform the method according to the first aspect or any implementation of the first aspect.

According to a fifth aspect, a chip system is provided. The chip system is applied to an electronic device, the chip system includes one or more processors, and the processor is configured to invoke computer instructions to enable the electronic device to perform the method according to the first aspect or any implementation of the first aspect.

According to a sixth aspect, a computer-readable storage medium is provided. The computer-readable storage medium stores computer program code, and when the computer program code is run by an electronic device, the electronic device is enabled to perform the method according to the first aspect or any implementation of the first aspect.

According to a seventh aspect, a computer program product is provided. The computer program product includes computer program code, and when the computer program code is run by an electronic device, the electronic device is enabled to perform the method according to the first aspect or any implementation of the first aspect.

In the embodiments of this application, the electronic device can capture the audio data in the shooting environment by using the at least two pickup apparatuses (for example, microphones); and the electronic device generates the switching instruction based on the audio data, automatically switches from the current first shooting mode to the second shooting mode based on the switching instruction, and displays the second image captured in the second shooting mode. Without requiring the user to switch shooting modes of the electronic device, the electronic device can automatically switch shooting modes to complete video recording, thereby improving shooting experience of the user.

DESCRIPTION OF EMBODIMENTS

In the embodiments of this application, the following terms "first", "second", and the like are intended only for description, and shall not be understood as an indication or implication of relative importance or an implicit indication of a quantity of indicated technical features. Therefore, a feature defined by "first" or "second" may explicitly or implicitly include one or more features. In the description of the embodiments, "a plurality of" means two or more, unless otherwise specified.

To facilitate understanding of the embodiments of this application, related concepts in the embodiments of this application are briefly described first.

1. Fourier Transform

The Fourier transform is a linear integral transform, used to represent a signal transform between time domain (or spatial domain) and frequency domain.

2. Fast Fourier Transform (Fast Fourier Transform, FFT)

The FFT is a fast discrete Fourier transform algorithm, which can transform a signal from time domain to frequency domain.

3. Blind Signal Separation (Blind Signal Separation, BSS)

Blind signal separation is an algorithm for restoring independent source signals from obtained mixed signals (usually output by a plurality of sensors).

4. Beamforming

Based on frequency domain signals obtained after an FFT transform is performed on input signals captured by different pickup apparatuses (for example, microphones), and filter coefficients at different angles, bear results at different angles can be obtained.

For example, $y(\omega)=\Sigma_{i=1}^{M}w_i^{H}(\omega)x_i(\omega)$, where $y(\omega)$ indicates beam results at different angles, $w_i^{H}(\omega)$ indicates filter coefficients at different angles, $x_i(\omega)$ indicates a frequency domain signal obtained after an FFT transform is performed on an input signal obtained by a pickup apparatus, i indicates a pickup signal of an $i^{th}$ microphone, and M indicates a quantity of microphones.

5. Voice Activity Detection (Voice Activity Detection, VAD)

Voice activity detection is a technology for voice processing, and its purpose is to detect whether a voice signal exists.

6. Direction-of-Arrival (Direction of Arrival, DPA) Estimation

Direction-of-arrival estimation is an algorithm that estimates a direction of arrival of a signal by performing a spatial Fourier transform on the received signal and then taking a square of a modulus to obtain a spatial spectrum.

7. Based on a Time Difference of Arrival (Time Difference of Arrival, TDOA)

The TDOA is used to indicate a time difference of a sound source arriving at different microphones in an electronic device.

8. Generalized Cross Correlation-Phase Transform (Generalized Cross Correlation-Phase Transform, GCC-PHAT)

Figure 12:
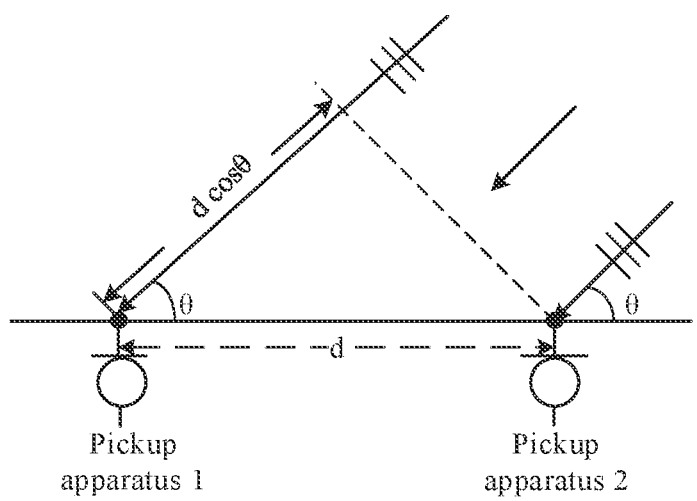
FIG. 12 is a schematic diagram of direction-of-arrival estimation according to an embodiment of this application.

The GCC-PHAT is an algorithm for calculating an angle of arrival (angle of arrival, AOA), as shown in FIG. 12.

9. Estimating Signal Parameter Via Rotational Invariance Techniques (Estimating Signal Parameter Via Rotational Invariance Techniques, ESPRIT)

The ESRT is an algorithm of rotational invariance techniques, and its principle is mainly to estimate signal parameters based on rotational invariance of a signal.

10. Location Algorithm of Steered Beamforming

A principle of a location algorithm of a steered beamforming method is to perform filtering and weighted summation on signals received by a microphone to form a beam, and search for a location of a sound source according to a rule, where the found location of the sound source is a real sound source direction when the microphone reaches maximum output power.

11. Cepstrum Algorithm

The cepstrum algorithm is a method in signal processing and signal detection. The cepstrum is a power spectrum of a logarithmic power spectrum of a signal. A principle for obtaining a speech by using the cepstrum is as follows: Because a voiced signal is periodically excited, the voiced signal is a periodic impulse on the cepstrum. Therefore, a pitch period can be obtained. Generally, a second impulse (a first impulse is envelope information) in a cepstrum waveform is considered as a fundamental frequency of an excitation source.

12. Inverse Discrete Fourier Transform (Inverse Discrete Fourier Transform, IDFT)

The IDFT is an inverse transform, that is, an inverse process of the Fourier transform.

13. Complex Angular Central Gaussian Mixture Model (Complex Angular Central Gaussian Mixture Model, cACGMM)

The cACGMM is a Gaussian mixture model. The Gaussian mixture model is a model formed based on a Gaussian probability density function (such as a normal distribution curve) by accurately quantizing a thing and decomposing the thing into several by using the Gaussian probability density function (such as the normal distribution curve).

14. Amplitude Spectrum

After a signal is transformed to the frequency domain, an amplitude spectrum can be obtained by performing a modulo operation on the signal.

15. Multi-Camera Video Recording

Figure 4:
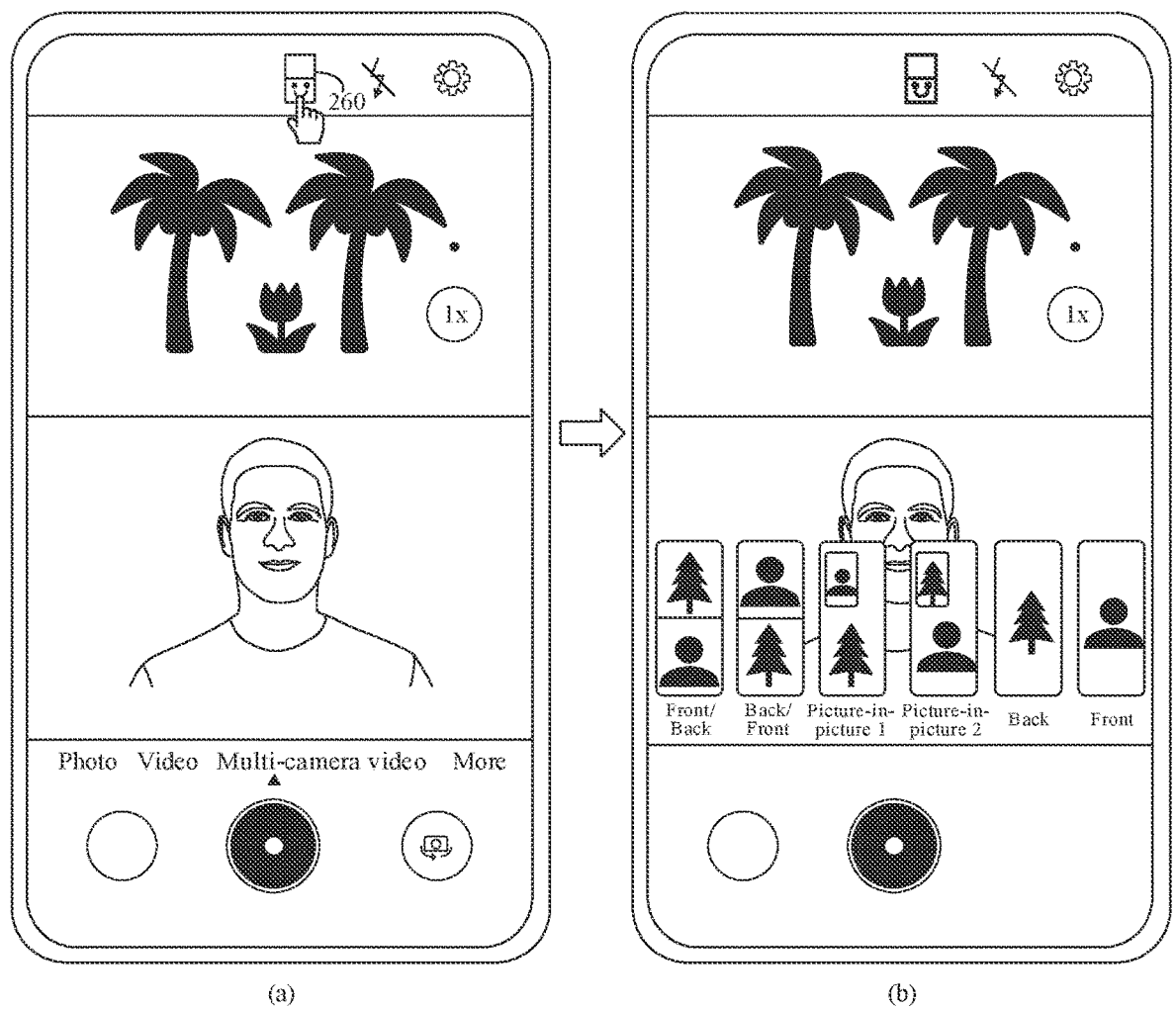
FIG. 4 is a schematic diagram of an application scenario to which an embodiment of this application is applicable.

As shown in (a) in FIG. 4, multi-camera video recording may refer to a camera mode similar to video recording, shooting, or the like in a camera application program. A plurality of different shooting modes may be included in multi-camera video recording. For example, as shown in (b) in FIG. 4, the shooting mode may include but is not limited to a front/back dual-shooting mode, a back/front dual-shooting mode, a picture-in-picture 1 mode, a picture-in-picture 2 mode, a back single-shooting mode, or a front single-shooting mode.

The following describes a video processing method and an electronic device in the embodiments of this application with reference to the accompanying drawings.

Figure 1:
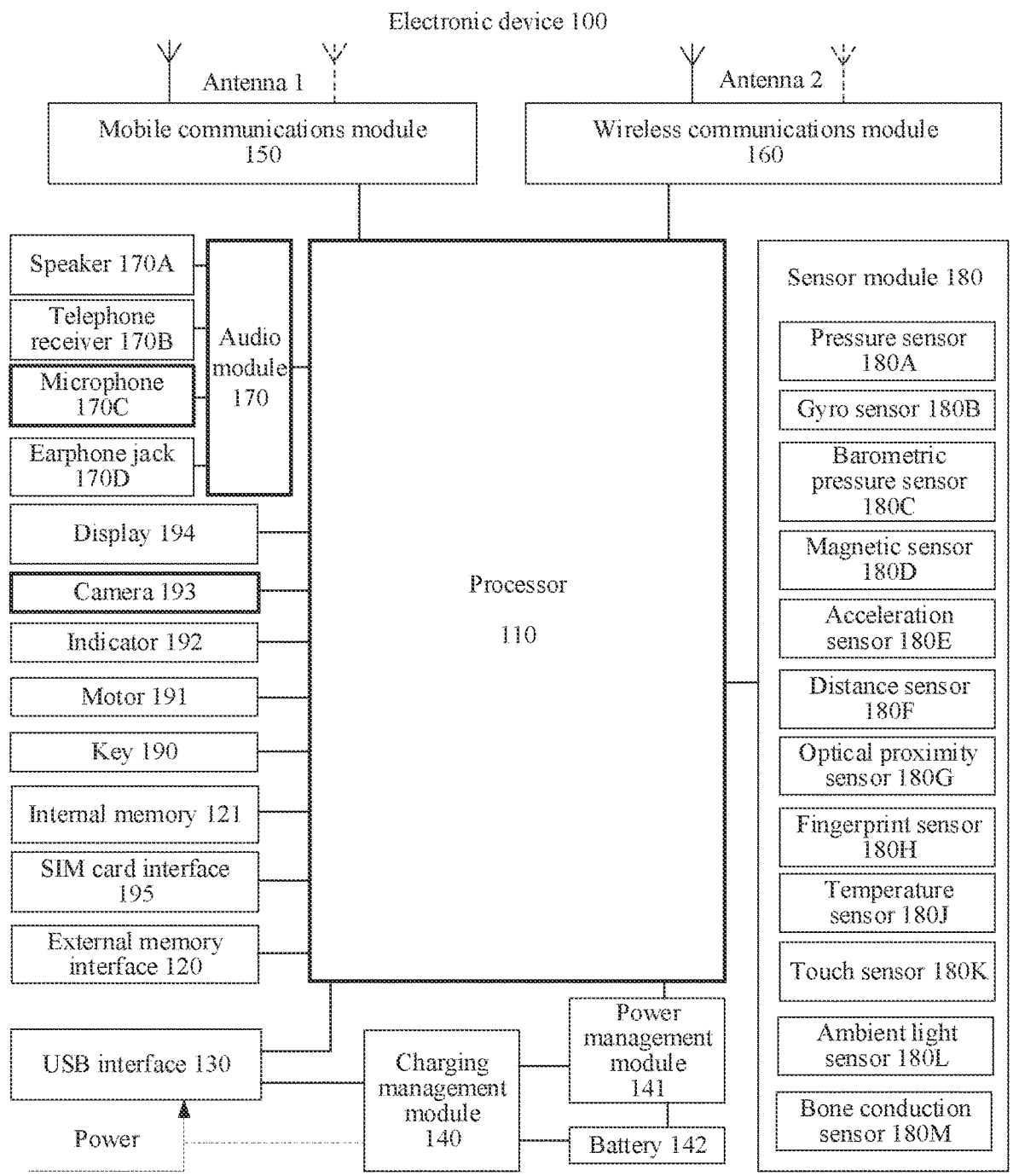
FIG. 1 is a schematic diagram of a hardware system of an electronic device to which this application is applicable.

FIG. 1 shows a hardware system of an electronic device to which this application is applicable.

The electronic device 100 may be a mobile phone, a smart screen, a tablet computer, a wearable electronic device, a vehicular electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

For example, the audio module 170 is configured to convert digital audio information into an analog audio signal for outputting, and may also be configured to convert an analog audio input into a digital audio signal. The audio module 170 may be further configured to encode and decode an audio signal. In some embodiments, the audio module 170 or some functional modules of the audio module 170 may be disposed in the processor 110.

For example, in this embodiment of this application, the audio module 170 can send audio data captured by the microphone to the processor 110.

It should be noted that the structure shown in FIG. 1 does not constitute a specific limitation on the electronic device 100. In other embodiments of this application, the electronic device 100 may include more or fewer components than those shown in FIG. 1, or the electronic device 100 may include a combination of some components shown in FIG. 1, or the electronic device 100 may include subcomponents of some components shown in FIG. 1. The components shown in FIG. 1 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent components, or may be integrated components. The controller may generate an operation control signal based on instruction operation code and a timing signal, and implement control over instruction fetching and instruction execution.

A memory may be further disposed in the processor 110, and is configured to store instructions and data. In some embodiments, the memory in the processor 110 is a cache memory. The memory may store an instruction or data that has just been used or cyclically used by the processor 110. If the processor 110 needs to use the instruction or data again, the processor 110 may invoke the instruction or data directly from the memory. Therefore, repeated access is avoided, a waiting time of the processor 110 is reduced, and efficiency of the system is improved.

For example, the processor 110 may be configured to perform a video processing method in an embodiment of this application, for example, running a camera application program on the electronic device; displaying a first image, where the first image is an image captured when the electronic device is in a first shooting mode; obtaining audio data, where the audio data is data captured by at least two pickup apparatuses, obtaining a switching instruction based on the audio data, where the switching instruction is used to instruct the electronic device to switch from the first shooting mode to a second shooting mode; and displaying a second image, where the second image is an image captured when the electronic device is in the second shooting mode.

A connection relationship between the modules shown in FIG. 1 is only a schematic illustration, and does not constitute a limitation on the connection relationship between the modules of the electronic device 100. Optionally, each module of the electronic device 100 may alternatively use a combination of a plurality of connection modes in the foregoing embodiment.

A wireless communication function of the electronic device 100 may be implemented by using components such as the antenna 1, the antenna 2, the mobile communications module 150, the wireless communications module 160, the modem processor, and the baseband processor.

The antenna 1 and the antenna 2 are configured to transmit and receive electromagnetic wave signals. Each antenna in the electronic device 100 may be configured to cover one or more communication frequency bands. Different antennas may also be reused to improve antenna utilization. For example, the antenna 1 may be reused as a diversity antenna of a wireless local area network. In other embodiments, the antenna may be used with a tuning switch.

The electronic device 100 may implement a display function by using the GPU, the display 194, and the application processor. The GPU is a microprocessor used for image processing, and is connected to the display 194 and the application processor. The GPU is configured to perform mathematical and geometric computation for graphic rendering. The processor 110 may include one or more GPUs, and the GPU executes a program instruction to generate or change display information.

The display 194 may be configured to display an image or a video.

The electronic device 100 may implement a shooting function by using the ISP, the camera 193, the video codec, the GPU, the display 194, the application processor, or the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transmits the electrical signal to the ISP for processing, so that the electrical signal is converted into an image visible to a naked eye. The ISP may perform algorithm optimization on noise, luminance, and color of the image. The ISP may further optimize parameters of a shooting scenario, such as exposure and color temperature. In some embodiments, the ISP may be disposed in the camera 193.

The camera 193 is configured to capture still images or videos. An optical image of an object is generated by a lens and projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, so that the electrical signal is converted into a digital image signal. The ISP outputs the digital image signal to the DSP for processing. The DSP converts the digital image signal into an image signal in a standard format such as red green blue (red green blue, RGB) or YUV. In some embodiments, the electronic device 100 may include one or N cameras 193, where N is a positive integer greater than 1.

For example, in this embodiment of this application, the electronic device may include a plurality of cameras 193; and the plurality of cameras may include a front camera and a back camera.

The digital signal processor is configured to process a digital signal. In addition to processing a digital image signal, the digital signal processor can also process other digital signals. For example, when the electronic device 100 selects a frequency, the digital signal processor is configured to perform a Fourier transform or the like on energy of the frequency.

The video codec is configured to compress or decompress a digital video. The electronic device 100 may support one or more video codecs. In this way, the electronic device 100 can play back or record videos in various encoding formats, for example, moving picture experts group (moving picture experts group, MPEG) 1, MPEG2, MPEG3, and MPEG4.

The gyro sensor 180B may be configured to determine a motion posture of the electronic device 100. In some embodiments, an angular velocity of the electronic device 100 around three axes (x-axis, y-axis, and z-axis) may be determined by using the gyro sensor 180B. The gyro sensor 180B may be used for shooting stabilization. For example, when the shutter is pressed, the gyroscope sensor 180B detects a dithering angle of the electronic device 100, calculates, based on the angle, a distance to be compensated by a lens module, and allows a lens to cancel dithering of the electronic device 100 through reverse motion to achieve anti-dithering. The gyroscope sensor 180B may be further used for navigation, somatosensory games, and other scenarios.

The acceleration sensor 180E may detect magnitudes of accelerations of the electronic device 100 in various directions (generally the x-axis, y-axis, and z-axis). A magnitude and direction of gravity can be detected when the electronic device 100 is stationary. The acceleration sensor 180E may be further configured to recognize a posture of the electronic device 100 as an input parameter for an application program such as switching between portrait orientation and landscape orientation or a pedometer.

The distance sensor 180F is configured to measure a distance. The electronic device 100 may measure a distance by using infrared or a laser. In some embodiments, for example, in the shooting scenario, the electronic device 100 may measure the distance by using the distance sensor 180F, to implement fast focusing.

The ambient light sensor 180L is configured to sense ambient light luminance. The electronic device 100 may adaptively adjust luminance of the display 194 based on the sensed ambient light luminance. The ambient light sensor 180L may also be configured to automatically adjust white balance during photographing. The ambient light sensor 180L may further cooperate with the optical proximity sensor 180G to detect whether the electronic device 100 is in a pocket, to avoid an unintentional touch.

The fingerprint sensor 180H is configured to capture a fingerprint. The electronic device 100 may implement functions such as unlocking, accessing an application lock, photographing, and answering a call by using a feature of the captured fingerprint.

The touch sensor 180K is also known as a touch device. The touch sensor 180K may be disposed on the display 194, and the touch sensor 180K and the display 194 form a touchscreen, which is also referred to as a touchscreen. The touch sensor 180K is configured to detect a touch operation performed on or near the touch sensor 180K. The touch sensor 180K may transmit the detected touch operation to the application processor to determine a touch event type. A visual output related to the touch operation may be provided by the display 194. In other embodiments, the touch sensor 180K may alternatively be disposed on a surface of the electronic device 100, and disposed in a position different from the display 194.

The hardware system of the electronic device 100 is described in detail above. The following describes a software system of the electronic device 100.

Figure 2:
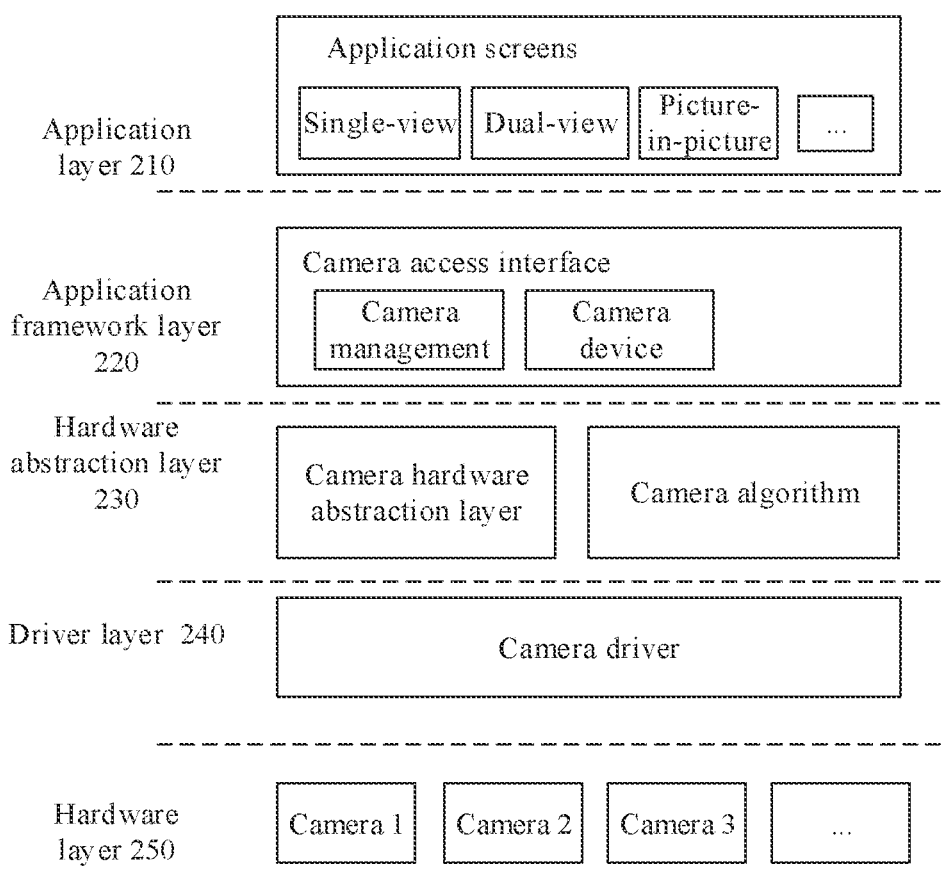
FIG. 2 is a schematic diagram of a software system of an electronic device to which this application is applicable.

FIG. 2 is a schematic diagram of a software system of an electronic device according to an embodiment of this application.

As shown in FIG. 2, a system architecture may include an application layer 210, an application framework layer 220, a hardware abstraction layer 230, a driver layer 240, and a hardware layer 250.

The application layer 210 may include application programs such as a camera application program, gallery, calendar, phone, map, navigation, WLAN, Bluetooth, music, video, and messaging. The application layer 210 may be further divided into application screens and application logic. Application screens of the camera application may include a single-view mode, a dual-view mode, a picture-in-picture mode, and the like corresponding to different video shooting modes.

The application framework layer 220 provides an application programming interface (application programming interface, API) and a programming framework for the application programs at the application layer. The application framework layer may include some predefined functions.

For example, the application framework layer 220 may include a camera access interface; and the camera access interface may include camera management and a camera device. Camera management may be used to provide an access interface for managing cameras; and the camera device may be used to provide an interface for accessing the cameras.

The hardware abstraction layer 230 is used for hardware abstraction. For example, the hardware abstraction layer may include a camera abstraction layer and other hardware device abstraction layers; and a camera hardware abstraction layer can invoke a camera algorithm.

For example, the hardware abstraction layer 230 includes the camera hardware abstraction layer and the camera algorithm; the camera algorithm may include a software algorithm for video processing or image processing.

For example, the algorithm in the camera algorithm may be implemented independently of particular hardware; for example, it is code that can be usually run on a CPU.

The driver layer 240 is configured to provide drivers for different hardware devices. For example, the driver layer may include a camera driver.

The hardware layer 250 is a lowest layer in an operating system. As shown in FIG. 2, the hardware layer 250 may include a camera 1, a camera 2, a camera 3, and the like. The camera 1, camera 2, and camera 3 may correspond to a plurality of cameras on the electronic device.

For example, the video processing method and the electronic device provided in the embodiments of this application can be run at the hardware abstraction layer; or may be run at the application framework layer; or may be run in a digital signal processor.

Currently, switching of shooting modes of an electronic device (for example, a camera) depends on a user's manual operation. Therefore, the user needs to be close to the electronic device in a shooting process. If the user is far away from the electronic device, switching of shooting modes of the electronic device needs to be implemented based on a Bluetooth technology. When switching of shooting modes of the electronic device is implemented based on the Bluetooth technology, a corresponding operation needs to be performed on a camera of the electronic device by using a control device. On one hand, the operation is complex. On the other hand, the control device is likely to be exposed in a video, and an aesthetic feeling of the video is affected, resulting in poor user experience.

In view of this, an embodiment of this application provides a video processing method. When a user uses an electronic device to capture a video, the electronic device can obtain a switching instruction based on audio data in a shooting environment, and the electronic device can automatically switch a shooting mode of the electronic device based on the switching instruction. For example, different cameras in the electronic device can be switched automatically. For example, the electronic device can automatically determine whether to switch a camera, or whether to enable multi-camera video recording, or whether to switch between different shooting modes in multi-camera video recording, to complete video recording without requiring the user to switch shooting modes of the electronic device, thereby achieving one-take video recording experience.

It should be understood that "one-take" means that after the user selects a shooting mode, the user does not need to perform a corresponding operation to switch shooting modes; the electronic device can automatically generate a switching instruction based on audio data captured in a shooting environment; and the electronic device automatically switches the shooting mode based on the switching instruction.

The video processing method provided in this embodiment of this application is hereinafter described in detail with reference to FIG. 3 to FIG. 15.

For example, the video processing method provided in this embodiment of this application may be applied to a video recording field, a video call field, or other image processing fields. In this embodiment of this application, audio data in a shooting environment is captured by using at least two pickup apparatuses (for example, microphones) in the electronic device; and a switching instruction is generated based on the audio data, and the electronic device automatically switches from a first shooting mode to a second shooting mode based on the switching instruction and displays a second image captured in the second shooting mode. Without requiring the user to switch shooting modes of the electronic device, the electronic device can automatically switch shooting modes to complete video recording, thereby improving shooting experience of the user.

In an example, the video processing method in this embodiment of this application may be applied to a preview state of video recording.

Figure 3:
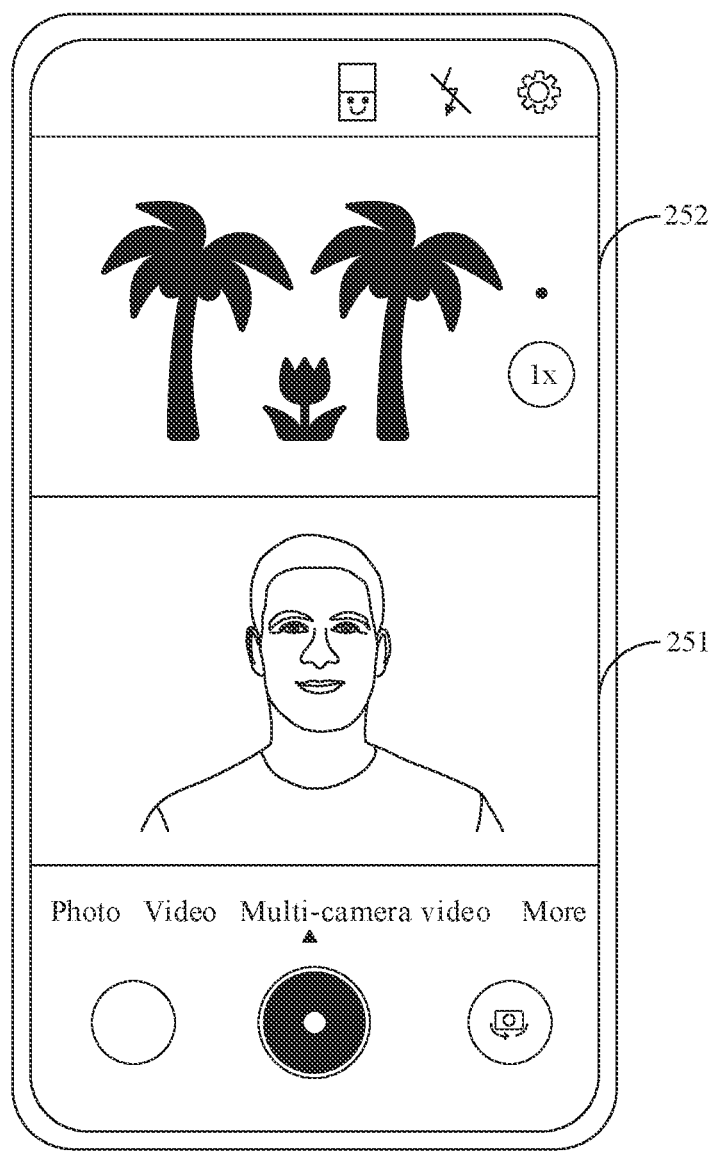
FIG. 3 is a schematic diagram of an application scenario to which an embodiment of this application is applicable.

As shown in FIG. 3, the electronic device is in a preview state of multi-camera video recording, and the current shooting mode of the electronic device may be a front/back dual-view shooting mode by default, where a front-view picture may be shown as an image 251, and a back-view picture may be shown as an image 252. The front-view picture may be an image captured by a front camera of the electronic device, and the back-view picture may be an image captured by a back camera of the electronic device. In the following description, it is assumed that the front-view picture is the image 251 and that the back-view picture may be the image 252.

As shown in (a) in FIG. 4, after the electronic device detects an operation on a control 260 of a shooting mode of multi-camera video recording, the electronic device may display a plurality of different shooting modes in multi-camera video recording. For example, the plurality of different shooting modes may include but are not limited to: a front/back dual-shooting mode, a back/front dual-shooting mode, a picture-in-picture 1 mode (back picture-in-picture mode), a picture-in-picture 2 mode (front picture-in-picture mode), a single-shooting mode of the back camera, and a single-shooting mode of the front camera, as shown in (b) in FIG. 4. According to the video processing method in this embodiment of this application, when the electronic device is in the preview state of multi-camera video recording, the at least two pickup apparatuses (for example, microphones) in the electronic device capture audio data in the shooting environment; and a switching instruction is generated based on the audio data, and the electronic device automatically switches from the first shooting mode to the second shooting mode based on the switching instruction and displays a second image captured in the second shooting mode. For example, it is assumed that when the electronic device enters the preview state of multi-camera video recording, the default shooting mode is the front/back dual-shooting mode shown in FIG. 3, and that the switching instruction obtained based on the audio data captured by the at least two pickup apparatuses in the electronic device is to switch the shooting mode of the electronic device to the back picture-in-picture mode. In this case, without requiring a user operation, the electronic device can automatically switch from the front/ back dual-shooting mode to the back picture-in-picture mode and display the second image, where the second image is a preview image.

The single-shooting mode may include a front single-shooting mode, a back single-shooting mode, or the like. The multi-shooting mode may include the front/back dual-shooting mode, the back/front dual-shooting mode, the picture-in-picture 1 mode, the picture-in-picture 2 mode, or the like.

Optionally, the multi-shooting mode may further include a front dual-shooting mode, a back dual-shooting mode, or the like.

It should be understood that in the single-shooting mode, one camera in the electronic device is used for video shooting; and in the multi-shooting mode, two or more cameras in the electronic device are used for video shooting.

For example, in the front single-shooting mode, one front camera is used for video shooting; in the back single-shooting mode, one back camera is used for video shooting; in the front dual-shooting mode, two front cameras are used for video shooting; in the back dual-shooting mode, two back cameras are used for video shooting; in the front/back dual-shooting mode, one front camera and one back camera are used for video shooting; in the front picture-in-picture mode, two front cameras are used for video shooting, and a picture shot by one front camera is placed in a picture shot by the other front camera; in the back picture-in-picture mode, two back cameras are used for video shooting, and a picture shot by one back camera is placed in a picture shot by the other back camera; or in the front/back picture-in-picture mode, one front camera and one back camera are used for video shooting, and a picture shot by the front camera or the back camera is placed in a picture shot by the back camera or the front camera.

Figure 5:
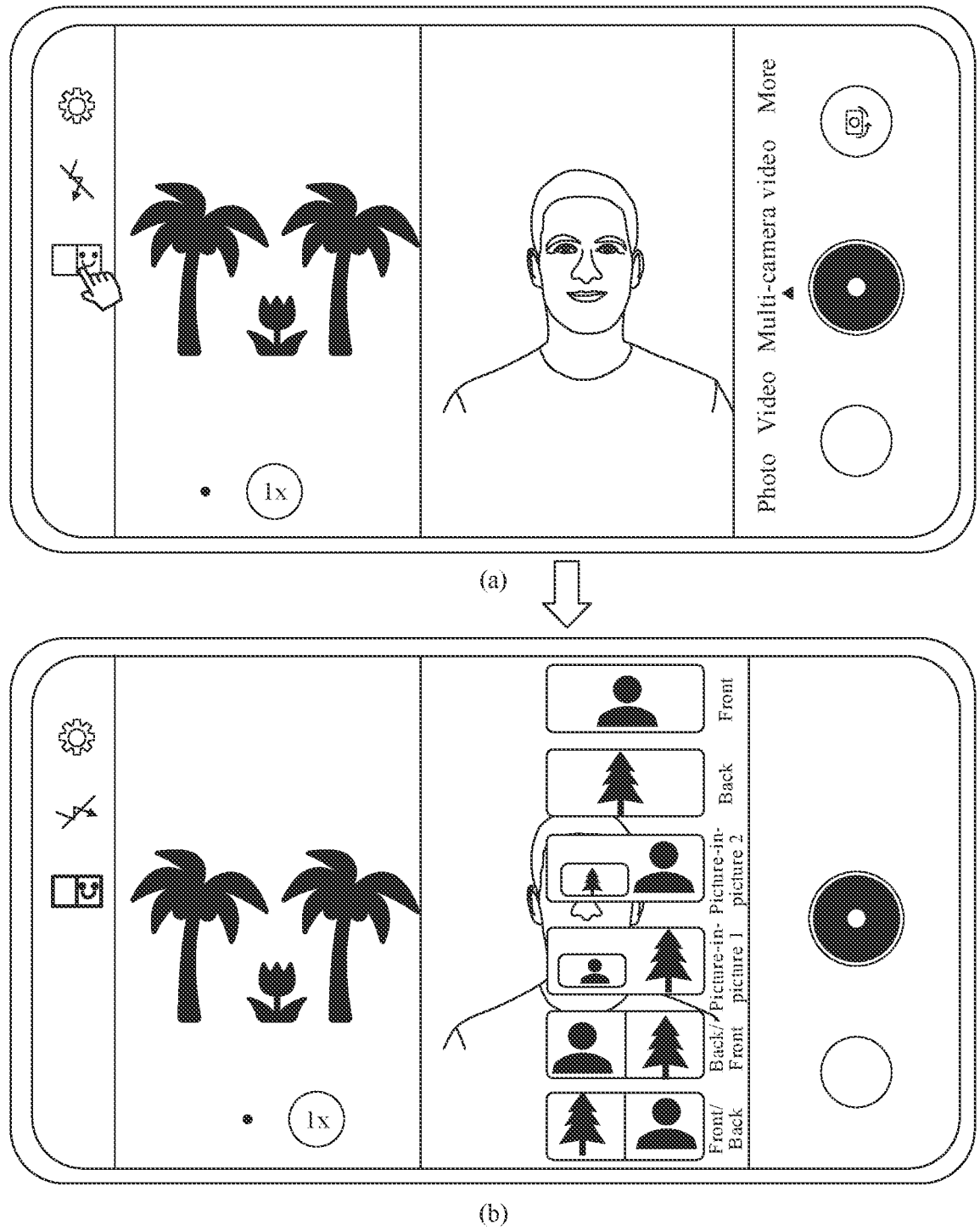
FIG. 5 is a schematic diagram of an application scenario to which an embodiment of this application is applicable.

It should be understood that FIG. 4 may be shooting screens of different shooting modes of multi-camera video recording in a portrait state of the electronic device; and FIG. 5 may be shooting screens of different shooting modes of multi-camera video recording in a landscape state of the electronic device, where (a) in FIG. 4 corresponds to (a) in FIG. 5, and (b) in FIG. 4 corresponds to (b) in FIG. 5; and the electronic device may determine the portrait orientation or the landscape orientation based on a status of the electronic device used by the user.

In an example, the video processing method in this embodiment of this application may be applied to a video recording process.

Figure 6:
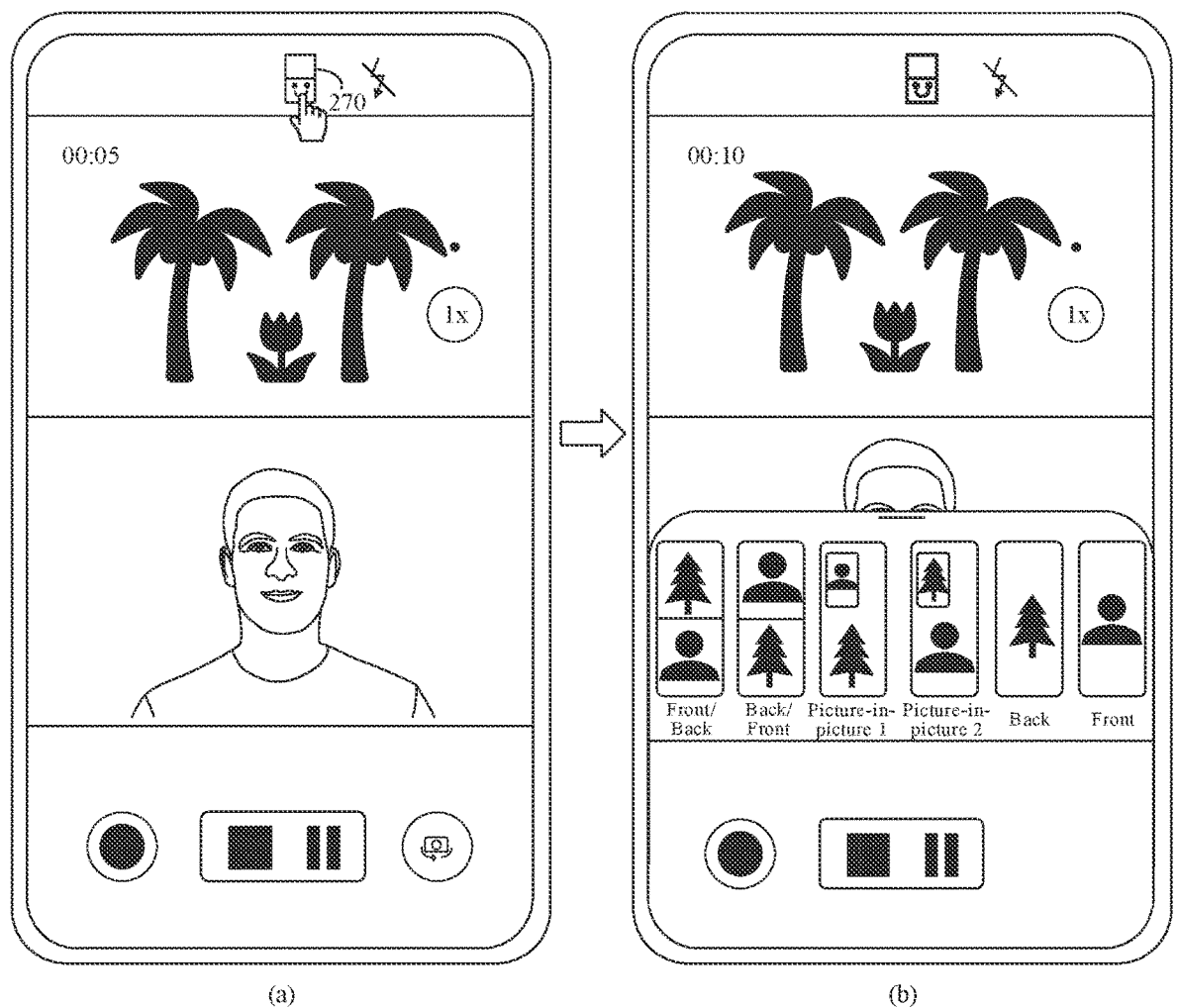
FIG. 6 is a schematic diagram of an application scenario to which an embodiment of this application is applicable.

As shown in FIG. 6, the electronic device is in a video recording state of multi-camera video recording, and the current shooting mode of the electronic device may be the front/back dual-view shooting mode by default. As shown in (a) in FIG. 6, after the electronic device detects an operation on a control 270 of a shooting mode of multi-camera video recording at a fifth second of video recording, the electronic device may display a plurality of different shooting modes in multi-camera video recording, as shown in (b) in FIG. 6. According to the video processing method in this embodiment of this application, when the electronic device is in the recording state of multi-camera video recording, the at least two pickup apparatuses (for example, microphones) in the electronic device capture audio data in the shooting environment, and a switching instruction is generated based on the audio data, and the electronic device automatically switches from the first shooting mode to the second shooting mode based on the switching instruction and displays a second image captured in the second shooting mode. For example, it is assumed that the electronic device is currently recording a video, and that the electronic device starts to record the video by using the default shooting mode, the front/back dual-shooting mode, and that the switching instruction obtained based on the audio data captured by the at least two pickup apparatuses in the electronic device is to switch the shooting mode of the electronic device to the back picture-in-picture mode. In this case, without requiring a user operation, the electronic device can automatically switch from the front/back dual-shooting mode to the back picture-in-picture mode and display the second image, where the second image is a video picture.

It should be understood that, although multi-camera video recording is used as an example for description above, the video processing method in this embodiment of this application may be further applied to scenarios such as a video call, a video conference application, a long/short video application, a video live application, an online video class application, and an AI photography application, and shooting scenarios such as video recording by using a system camera video recording function, video surveillance, or a smart cat eye.

In an example, the video processing method in this embodiment of this application may be further applied to the video recording state of the electronic device. For example, when the electronic device is in the video recording state, the default back single-shooting mode may be used. The at least two pickup apparatuses (for example, microphones) in the electronic device capture audio data in the shooting environment; and a switching instruction is generated based on the audio data, and the electronic device can automatically switch from the back single-shooting mode to the front single-shooting mode based on the switching instruction; or the electronic device can automatically switch from the single-shooting mode to the multi-shooting mode based on the switching instruction and display a second image captured in the second shooting mode, where the second image may be a preview image or the second image may be a video picture. Optionally, the video processing method in this embodiment of this application may be further applied to the photography field. For example, when the electronic device is in the video recording state, the default back single-shooting mode may be used. The at least two pickup apparatuses (for example, microphones) in the electronic device capture audio data in the shooting environment; and a switching instruction is generated based on the audio data, and the electronic device automatically switches from the back single-shooting mode to the front single-shooting mode based on the switching instruction and displays a second image captured in the second shooting mode, where the second image may be a preview image or the second image may be a video picture.

It should be understood that the foregoing describes the application scenarios by using examples and does not constitute any limitation on the application scenarios of this application.

Figure 7:
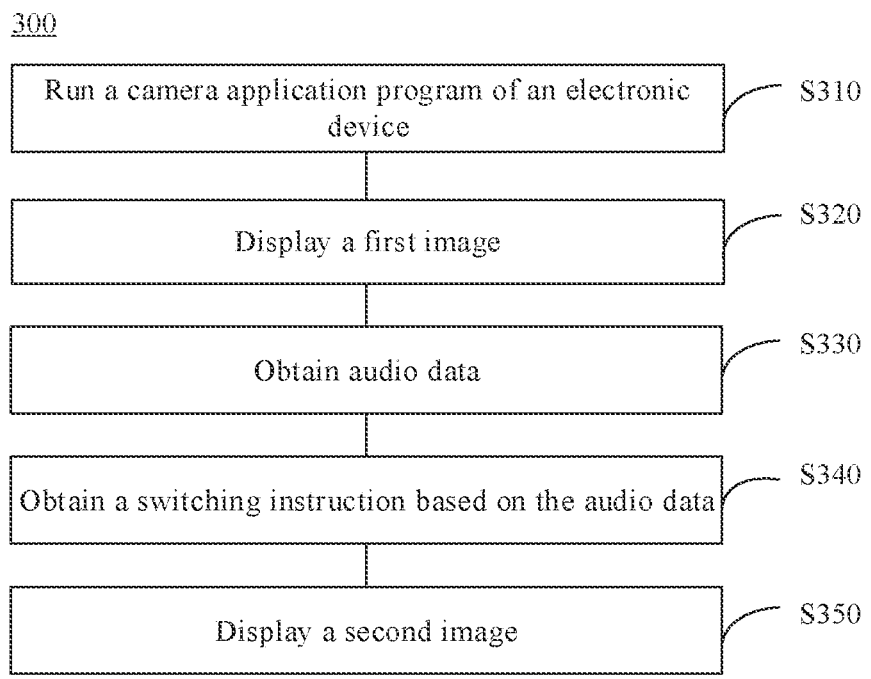
FIG. 7 is a schematic flowchart of a video processing method according to an embodiment of this application.

FIG. 7 is a schematic flowchart of a video processing method according to an embodiment of this application. The video processing method 300 may be performed by the electronic device shown in FIG. 1. The video processing method includes steps S310 to S350. The following describes steps S310 to S350 in detail separately.

Step S310: Run a camera application program of an electronic device.

For example, by tapping an icon of the "camera" application program, a user can instruct the electronic device to run the camera application. Alternatively, when the electronic device is in a lock screen state, by performing a right-sliding gesture on a display of the electronic device, a user can instruct the electronic device to run the camera application. Alternatively, when the electronic device is in a lock screen state, a lock screen includes the icon of the camera application program, and by tapping the icon of the camera application program, a user instructs the electronic device to run the camera application program. Alternatively, when the electronic device is running another application, the application has a right to invoke the camera application program; and by tapping a corresponding control, a user can instruct the electronic device to run the camera application program. For example, when the electronic device is running an instant messaging application program, by selecting a control of a camera function, a user can instruct the electronic device to run the camera application program.

Step S320: Display a first image.

The first image is an image captured when the electronic device is in a first shooting mode.

For example, the first shooting mode may be either of a single-shooting mode and a multi-shooting mode, where the single-shooting mode may include a front single-shooting mode or a back single-shooting mode; and the multi-shooting mode may include a front/back dual-shooting mode, a back/front dual-shooting mode, a picture-in-picture front main picture mode, or a picture-in-picture back main picture mode.

For example, in the front single-shooting mode, one front camera in the electronic device is used for video shooting; in the back single-shooting mode, one back camera in the electronic device is used for video shooting; in the front/back dual-shooting mode, one front camera and one back camera are used for video shooting; in the picture-in-picture front mode, one front camera and one back camera are used for video shooting, and a picture shot by the back camera is placed in a picture shot by the front camera, and the picture shot by the front camera is a main picture; or in the picture-in-picture back mode, one front camera and one back camera are used for video shooting, a picture shot by the front camera is placed in a picture shot by the back camera, and the picture shot by the back camera is a main picture.

Optionally, the multi-shooting mode may further include a front dual-shooting mode, a back dual-shooting mode, a front picture-in-picture mode, a back picture-in-picture mode, or the like.

Optionally, when the electronic device is in video recording preview, the first image is a preview image.

Optionally, when the electronic device is in video recording, the first image is a video picture.

Optionally, when the electronic device is in multi-camera video recording preview, the first image is a preview image.

Optionally, when the electronic device is in multi-camera video recording, the first image is a video picture.

Step S330: Obtain audio data.

The audio data is data captured by at least two pickup apparatuses in the electronic device, for example, data captured by at least two microphones.

It should be understood that in this embodiment of this application, because the electronic device needs to determine directivity of the audio data, the electronic device in this embodiment of this application includes the at least two pickup apparatuses, but a specific quantity of pickup apparatuses is not limited.

Figure 9:
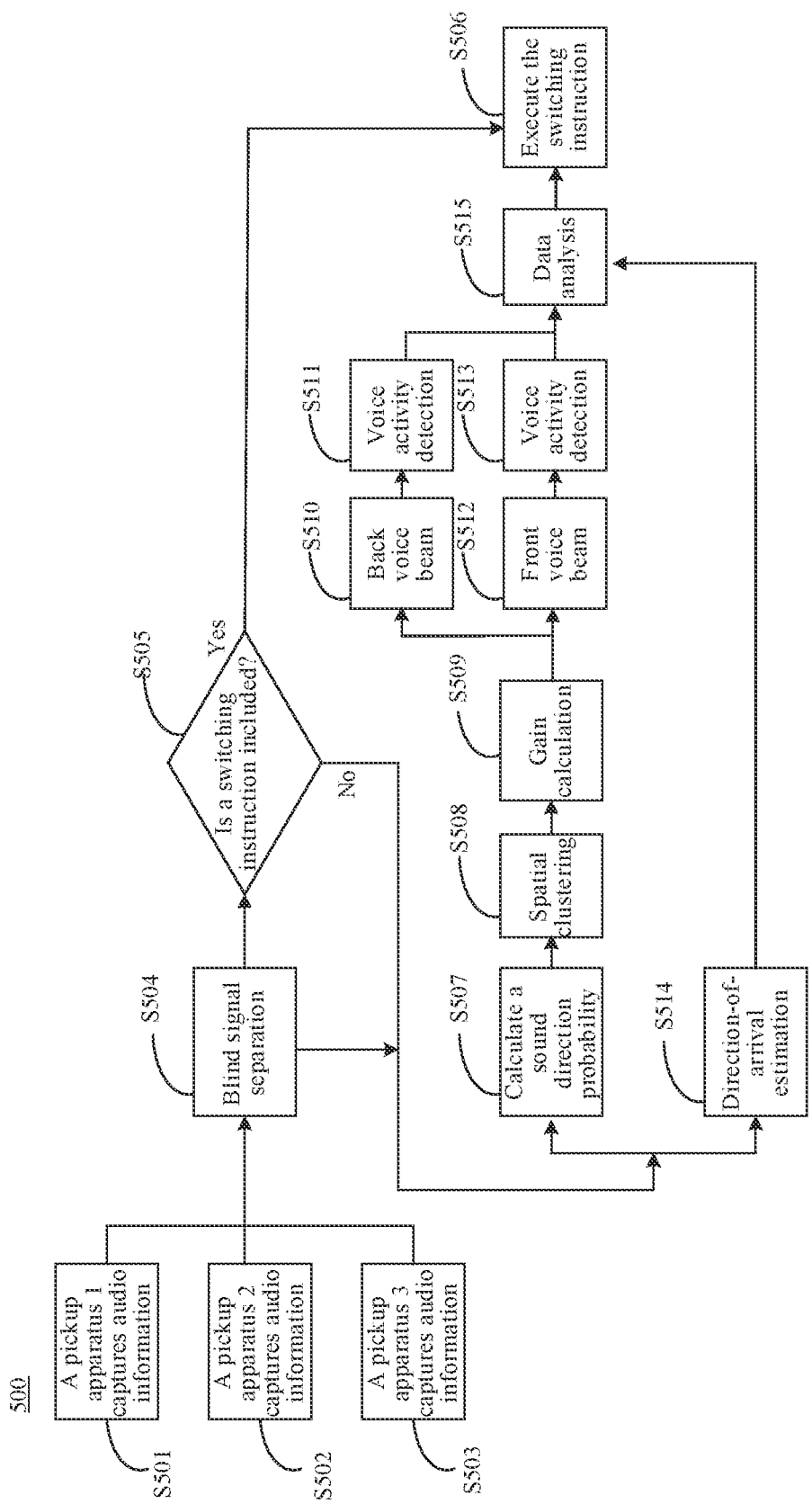
FIG. 9 is a schematic flowchart of a video processing method according to an embodiment of this application.

For example, as shown in FIG. 9 subsequently, the electronic device includes three pickup apparatuses.

For example, the audio data may be data captured by the pickup apparatuses in a shooting environment in which the electronic device is located.

Step S340: Obtain a switching instruction based on the audio data.

The switching instruction is used to instruct the electronic device to switch from the first shooting mode to a second shooting mode.

It should be understood that the first shooting mode and the second shooting mode may be the same shooting mode or different shooting modes. If the switching instruction is a default current shooting mode, the second shooting mode and the first shooting mode may be the same shooting mode, for example, an identifier 0 shown in Table 1. In other cases, the second shooting mode and the first shooting mode may be different shooting modes, for example, an identifier 1 to an identifier 6 shown in Table 1.

Step S350: Display a second image.

The second image is an image captured when the electronic device is in the second shooting mode.

In this embodiment of this application, the electronic device can capture the audio data in a shooting environment by using the at least two pickup apparatuses (for example, microphones); and the electronic device generates the switching instruction based on the audio data, automatically switches from the current first shooting mode to the second shooting mode based on the switching instruction, and displays the second image captured in the second shooting mode. Without requiring the user to switch shooting modes of the electronic device, the electronic device can automatically switch shooting modes to complete video recording, thereby improving shooting experience of the user.

For example, the electronic device may include a first camera (for example, a front camera) and a second camera (for example, a back camera), and the first camera and the second camera may be located in different directions of the electronic device; and the obtaining a switching instruction based on the audio data includes:

recognizing whether the audio data includes a target keyword, where the target keyword is text information corresponding to the switching instruction;

in a case that the target keyword is recognized in the audio data, obtaining the switching instruction based on the target keyword;

in a case that the target keyword is not recognized in the audio data, processing the audio data to obtain audio data in a first direction and/or audio data in a second direction, where the first direction is used to indicate a first preset angle range corresponding to the first camera, and the second direction is used to indicate a second preset angle range corresponding to the second camera; and obtaining the switching instruction based on the audio data in the first direction and/or the audio data in the second direction.

In this embodiment of this application, whether the audio data includes the target keyword may be recognized first. If the audio data includes the target keyword, the electronic device switches the shooting mode to the second shooting mode corresponding to the target keyword. If the audio data does not include the target keyword, the electronic device may obtain the switching instruction based on the audio data in the first direction and/or the audio data in the second direction. For example, if the user is in front of the electronic device, a front camera is usually used to capture an image. If there is audio information of the user in a front direction of the electronic device, it may be considered that the user is in the front direction of the electronic device, and the front camera may be turned on in this case. If the user is behind the electronic device, a back camera is usually used to capture an image. If there is audio information of the user in a back direction of the electronic device, it may be considered that the user is in the back direction of the electronic device, and the back camera may be turned on in this case.

Figure 10:
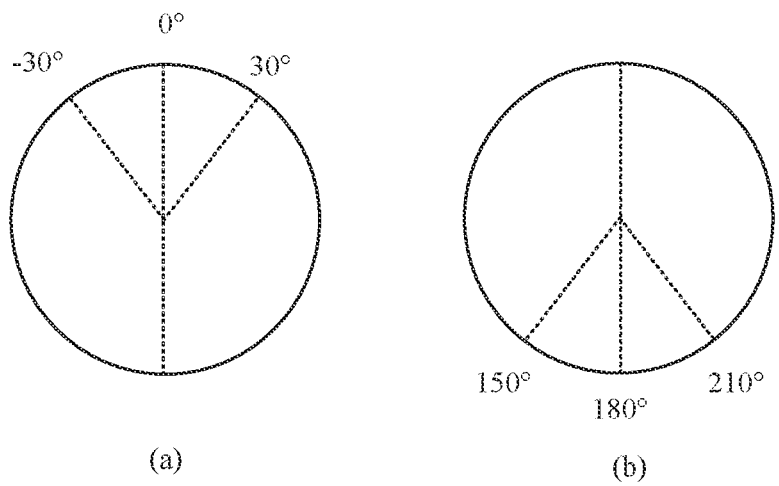
FIG. 10 is a schematic diagram of a target angle of an electronic device according to an embodiment of this application.

The target keyword may include but is not limited to: front camera, back camera, front video recording, back video recording, dual-view video recording, picture-in-picture video recording, or the like. The first direction may be the front direction of the electronic device, and the first preset angle range may refer to −30 degrees to 30 degrees; and the second direction may be the back direction of the electronic device, and the second preset angle range may refer to 150 degrees to 210 degrees, as shown in FIG. 10.

For example, the audio data may be processed based on a sound direction probability calculation algorithm to obtain the audio data in the first direction (for example, the front direction) and/or the audio data in the second direction (for example, the back direction). For a specific process, refer to steps S507 to S510 and S512 shown in FIG. 9 subsequently. Details are not described herein.

In this embodiment of this application, a probability of audio data in each direction may be calculated, so that audio data in various directions is separated and that the audio data in the first direction and the audio data in the second direction are obtained; the switching instruction may be obtained based on the audio data in the first direction and/or the audio data in the second direction; and the electronic device can automatically switch shooting modes based on the switching instruction.

For example, the obtaining the switching instruction based on the audio data in the first direction and/or the audio data in the second direction includes:

obtaining the switching instruction based on energy of a first amplitude spectrum and/or energy of a second amplitude spectrum, where the first amplitude spectrum is an amplitude spectrum of the audio data in the first direction, and the second amplitude spectrum is an amplitude spectrum of the audio data in the second direction.

It should be understood that in a video recording scenario, usually, a direction in which energy of audio data is greater (for example, a direction in which volume of audio information is greater) may be considered as a main shooting direction. The main shooting direction may be obtained based on energy of amplitude spectra of audio data in different directions. For example, if the energy of the amplitude spectrum of the audio data in the first direction is greater than the energy of the amplitude spectrum of the audio data in the second direction, the first direction may be considered as the main shooting direction. In this case, a camera corresponding to the first direction in the electronic device can be turned on.

For example, the switching instruction may include a current shooting mode, a first picture-in-picture mode, a second picture-in-picture mode, a first dual-view mode, a second dual-view mode, a single-shooting mode of the first camera, or a single-shooting mode of the second camera, and the obtaining the switching instruction based on energy of a first amplitude spectrum and/or energy of a second amplitude spectrum includes:

if the energy of the first amplitude spectrum and the energy of the second amplitude spectrum are both less than a first preset threshold, the obtained switching instruction is to maintain the current shooting mode;

if the energy of the first amplitude spectrum is greater than a second preset threshold, and the energy of the second amplitude spectrum is less than or equal to the second preset threshold, the switching instruction is to switch to the single-shooting mode of the first camera;

if the energy of the second amplitude spectrum is greater than a second preset threshold, and the energy of the first amplitude spectrum is less than or equal to the second preset threshold, the switching instruction is to switch to the single-shooting mode of the second camera;

if the energy of the first amplitude spectrum is greater than a second preset threshold, and the energy of the second amplitude spectrum is greater than or equal to a first preset threshold, the switching instruction is to switch to the first picture-in-picture mode;

if the energy of the second amplitude spectrum is greater than a second preset threshold, and the energy of the first amplitude spectrum is greater than or equal to a first preset threshold, the switching instruction is to switch to the second picture-in-picture mode;

if the energy of the first amplitude spectrum and the energy of the second amplitude spectrum are both greater than or equal to a second preset threshold, and the energy of the first amplitude spectrum is greater than the energy of the second amplitude spectrum, the switching instruction is to switch to the first dual-view mode; or if the energy of the first amplitude spectrum and the energy of the second amplitude spectrum are both greater than or equal to a second preset threshold, and the energy of the second amplitude spectrum is greater than the energy of the first amplitude spectrum, the switching instruction is to switch to the second dual-view mode, where the second preset threshold is greater than the first preset threshold, the first picture-in-picture mode is a shooting mode in which an image captured by the first camera is a main picture, the second picture-in-picture mode is a shooting mode in which an image captured by the second camera is a main picture, the first dual-view mode is a shooting mode in which the image captured by the first camera is located on an upper or left side of the display of the electronic device, and the second dual-view mode is a shooting mode in which the image captured by the second camera is located on the upper or left side of the display of the electronic device.

Optionally, for a specific implementation of the foregoing process, refer to related descriptions of step S515 shown in FIG. 9.

For example, the first amplitude spectrum is a first average amplitude spectrum obtained by averaging amplitude spectra corresponding to all frequencies in the audio data in the first direction; and/or the second amplitude spectrum is a second average amplitude spectrum obtained by averaging amplitude spectra corresponding to all frequencies in the audio data in the second direction.

In this embodiment of this application, the amplitude spectrum obtained by averaging the amplitude spectra of different frequencies in the audio data in the first direction may be referred to as the first average amplitude spectrum; and the amplitude spectrum obtained by averaging the amplitude spectra of different frequencies in the audio data in the second direction may be referred to as the second average amplitude spectrum. Because the first average amplitude spectrum and/or the second average amplitude spectrum are/is the amplitude spectrum obtained by averaging the amplitude spectra of different frequencies, accuracy of the audio data in the first direction and/or accuracy of information in the audio data in the first direction can be improved.

Optionally, the first amplitude spectrum is an amplitude spectrum obtained after first amplification processing and/or second amplification processing are/is performed on a first average amplitude spectrum, and the first average amplitude spectrum is obtained by averaging amplitude spectra corresponding to all frequencies in the audio data in the first direction.

For example, the video processing method further includes:
performing voice detection on the audio data in the first direction to obtain a first detection result;
estimating a direction of arrival of the data captured by the at least two pickup apparatuses to obtain angle prediction information; and
if the first detection result indicates that the audio data in the first direction includes audio information of the user, performing the first amplification processing on the amplitude spectrum of the audio data in the first direction; and/or if the angle prediction information includes angle information within the first preset angle range, performing the second amplification processing on the amplitude spectrum of the audio data in the first direction.

Optionally, the second amplitude spectrum is an amplitude spectrum obtained after first amplification processing and/or second amplification processing are/is performed on a second average amplitude spectrum, and the second average amplitude spectrum is obtained by averaging amplitude spectra corresponding to all frequencies in the audio data in the second direction.

For example, the video processing method further includes:
performing voice detection on the audio data in the second direction to obtain a second detection result;
estimating a direction of arrival of the data captured by the at least two pickup apparatuses to obtain angle prediction information; and
if the second detection result indicates that the audio data in the second direction includes audio information of the user, performing the first amplification processing on the amplitude spectrum of the audio data in the second direction; and/or if the angle prediction information includes angle information within the second preset angle range, performing the second amplification processing on the amplitude spectrum of the audio data in the second direction.

It should be understood that in the video recording scenario, usually, a direction in which the user is located may be considered as the main shooting direction. If the detection result indicates that the direction includes the audio information of the user, it may be considered that the user is in the direction. In this case, the first amplification processing may be performed on the audio data in this direction, and accuracy of the obtained audio information of the user can be improved through the first amplification processing.

It should also be understood that in the video recording scenario, usually, the direction in which the user is located may be considered as the main shooting direction. If the detection result indicates that the direction includes the audio information of the user, it may be considered that the user is in the direction. In this case, the first amplification processing may be performed on the audio data in this direction, and accuracy of the obtained audio information of the user can be improved through the first amplification processing. When the angle prediction information includes the first preset angle range and/or the second preset angle range, it may indicate that there is audio information in the first direction and/or the second direction of the electronic device; accuracy of the first amplitude spectrum or the second amplitude spectrum can be improved through the second amplification processing; and the switching instruction can be accurately obtained while accuracy of the amplitude spectrum and the audio information of the user is improved.

Optionally, for a specific process of the foregoing voice detection, refer to related descriptions of step S511 or step S513 in FIG. 9 subsequently.

Optionally, for a specific process of the foregoing first amplification processing and/or second amplification processing, refer to related descriptions of step S515 in FIG. 9.

For example, direction-of-arrival estimation is an algorithm that estimates a direction of arrival of a signal by performing a spatial Fourier transform on the received signal and then taking a square of a modulus to obtain a spatial spectrum.

Optionally, for a specific process of direction-of-arrival estimation, refer to related descriptions of step S407 in FIG. 8 or step S514 in FIG. 9 subsequently.

For example, the recognizing whether the audio data includes a target keyword includes:
performing separation processing on the audio data based on a blind signal separation algorithm to obtain N pieces of audio information, where the N pieces of audio information are audio information of different users; and
recognizing each of the N pieces of audio information to determine whether the N pieces of audio information include the target keyword.

In this embodiment of this application, separation processing may be first performed on the audio data captured by the at least two pickup apparatuses to obtain the N pieces of audio information of different sources; and whether the target keyword is included is recognized in each of the N pieces of audio information. Therefore, accuracy of recognizing the target keyword can be improved.

For example, the blind signal separation algorithm is an algorithm for restoring independent source signals from obtained mixed signals (usually output by a plurality of sensors).

Optionally, for a specific process of the blind signal separation algorithm, refer to related descriptions of step S405 in FIG. 8 or step S504 in FIG. 9 subsequently.

Optionally, for a specific process of recognizing the target keyword in the audio data, refer to related descriptions in FIG. 11 subsequently.

In this embodiment of this application, the electronic device can capture the audio data in a shooting environment by using the at least two pickup apparatuses (for example, microphones); and the electronic device generates the switching instruction based on the audio data, automatically switches from the current first shooting mode to the second shooting mode based on the switching instruction, and displays the second image captured in the second shooting mode. Without requiring the user to switch shooting modes of the electronic device, the electronic device can automatically switch shooting modes to complete video recording, thereby improving shooting experience of the user.

Figure 8:
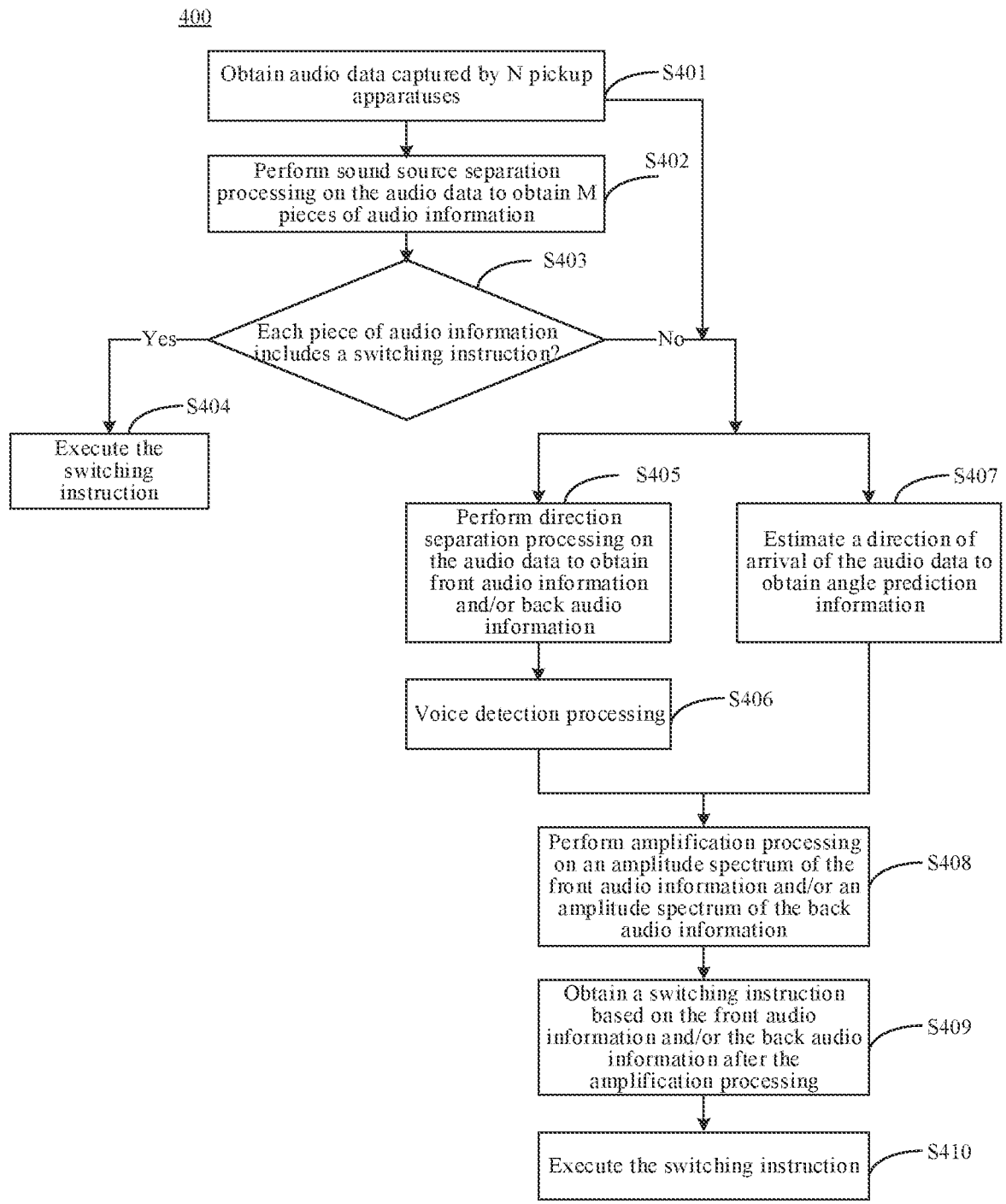
FIG. 8 is a schematic flowchart of a video processing method according to an embodiment of this application.

FIG. 8 is a schematic flowchart of a video processing method according to an embodiment of this application. The video processing method 400 may be performed by the electronic device shown in FIG. 1. The video processing method includes steps S401 to S410. The following describes steps S401 to S410 in detail separately.

Step S401: Obtain audio data captured by N pickup apparatuses (for example, microphones).

Step S402: Perform sound source separation processing on the audio data to obtain M pieces of audio information.

It should be understood that sound source separation may also be referred to as sound source separation. For example, a Fourier transform may be performed on the obtained N pieces of audio data, and then frequency domain data in the N pieces of audio data plus hyperparameters may be sent to a separator for sound source separation, to obtain the M pieces of audio information.

Step S403: Determine whether each piece of audio information includes a switching instruction; and if the switching instruction is included, perform step S404; or if the switching instruction is not included, perform steps S405 to S410.

Optionally, whether each of the M pieces of audio information includes the switching instruction (an example of a target keyword) is determined; and if any one of the M pieces of audio information includes the switching instruction, step S404 is performed; or if none of the M pieces of audio information includes the switching instruction, steps S405 to S410 are performed.

For example, the switching instruction may include but is not limited to: switching to a front camera, switching to a back camera, front video recording, back video recording, dual-view video recording, picture-in-picture video recording, or the like. Optionally, a switching instruction recognition method may be shown in FIG. 11 subsequently.

Step S404: Execute the switching instruction.

It should be understood that, that an electronic device executes the switching instruction may be that the electronic device can automatically switch a camera of the electronic device based on the switching instruction without requiring a user to manually switch a camera application program.

Step S405: Perform direction separation processing on the audio data to obtain front audio information and/or back audio information.

Optionally, direction separation processing is performed on the audio data captured by the N microphones to obtain the front audio information (an example of audio data in a first direction) and/or the back audio information (an example of audio data in a second direction).

In this embodiment of this application, if the switching instruction is detected in the M pieces of audio information, the electronic device automatically executes the switching instruction; or if the switching instruction is not detected in the M pieces of audio information, the electronic device may obtain the front audio information within a target angle in a front direction of the electronic device and/or the back audio information within a target angle in a back direction of the electronic device based on the N pieces of audio data captured by the pickup apparatuses; and analysis may be performed based on energy of the front audio information and energy of the back audio information to obtain the switching instruction, so that the electronic device executes the corresponding switching instruction.

For example, as shown in FIG. 10, a front voice beam may refer to audio data in the front direction of the electronic device; the target angle in the front direction of the electronic device (an example of the first preset angle range) may be [−30, 30]; a back voice beam may refer to audio data in the back direction of the electronic device; and the target angle in the back direction of the electronic device (an example of the second preset angle range) may be [150, 210].

Optionally, the N pieces of audio data may be separated into front audio data and/or back audio data based on a sound direction probability of the N pieces of audio data captured by the pickup apparatuses in each direction of the electronic device. For example, for a specific implementation method, refer to steps S507 to S511 shown in FIG. 6.

Step S406: Perform voice detection processing.

Optionally, voice detection processing is performed on the front audio information and/or the back audio information to obtain a detection result.

In this embodiment of this application, the voice detection processing of the front audio information and/or the back audio information is to determine whether audio information of the user is included in the front audio information and/or the back audio information. If the front audio information (or the back audio information) includes the audio information of the user, amplification processing may be performed on the front audio information (or the back audio information) to ensure that the audio information of the user can be accurately obtained.

For example, the voice detection processing may include but is not limited to voice activity detection or another method for detecting the audio information of the user. This is not limited in this application.

Step S407: Estimate a direction of arrival of the audio data to obtain angle prediction information.

Optionally, the direction of arrival of the audio data captured by the N microphones is estimated to obtain the angle prediction information.

In this embodiment of this application, the N pieces of audio data captured by the pickup apparatuses may be separated into the front audio information and/or the back audio information in steps S405 and S406. Further, angle information corresponding to the audio data may be obtained by estimating the direction of arrival of the N pieces of audio data captured by the pickup apparatuses, so that whether the audio data obtained by the pickup apparatuses is within the target angle range can be determined. For example, whether the audio data is within the target angle range in the front direction of the electronic device or within the target angle range in the back direction is determined.

Optionally, for a specific implementation method for estimating the direction of arrival of the audio data captured by the N microphones to obtain the angle prediction information, refer to step S514 shown in FIG. 9.

Optionally, step S405, step S406, and step S408 to step S410 may be performed in a case that the switching instruction is not included in each piece of audio information.

Step S408: Perform amplification processing on an amplitude spectrum of the front audio information and/or an amplitude spectrum of the back audio information.

For example, amplification processing may be performed on the amplitude spectrum of the front audio information and/or the amplitude spectrum of the back audio information based on the detection result of the voice detection processing.

In this embodiment of this application, when the detection result of the voice detection corresponding to the front audio information (or the back audio information) includes the audio information of the user, amplification processing may be performed on the amplitude spectrum of the front audio information (or the back audio information) to improve accuracy of the obtained audio information of the user.

For example, amplification processing may be performed on the amplitude spectrum of the front audio information and/or the amplitude spectrum of the back audio information based on the detection result of the voice detection processing and the angle prediction information.

In this embodiment of this application, when the angle prediction information includes the target angle in the front direction or the back direction of the electronic device, amplification processing may be performed on the amplitude spectrum of the front audio information (or the back audio information) to improve accuracy of the amplitude spectrum. In addition, when the detection result of the voice detection corresponding to the front audio information (or the back audio information) includes the audio information of the user, amplification processing may be performed on the amplitude spectrum of the front audio information (or the back audio information) to improve accuracy of the obtained audio information of the user. Therefore, accuracy of the obtained switching instruction can be improved while accuracy of the amplitude spectrum and accuracy of the audio information of the user are improved.

For example, the amplitude spectrum of the front audio information and the amplitude spectrum of the back audio information are calculated separately; and when the detection result of the voice detection processing indicates that the front audio information includes the audio information of the user, first amplification processing may be performed on the amplitude spectrum of the front audio information; or when the voice activity detection result indicates that the back audio information includes the audio information of the user, first amplification processing may be performed on the amplitude spectrum of the back audio information. For example, an amplification coefficient of the first amplification processing is $\alpha(1<\alpha<2)$.

For example, when the angle prediction information obtained based on the direction-of-arrival estimation indicates that the N pieces of audio data captured by the pickup apparatuses include the target angle in the front direction, second amplification processing may be performed on the amplitude spectrum of the front audio information; or when the angle prediction information obtained based on the direction-of-arrival estimation indicates that the N pieces of audio data captured by the pickup apparatuses include the target angle in the back direction, second amplification processing may be performed on the amplitude spectrum of the back audio information. For example, an amplification coefficient of the second amplification processing is $\beta(1<\beta<2)$. In this way, the amplitude spectrum of the front audio information and/or the amplitude spectrum of the back audio information after the amplification processing are/is obtained.

Optionally, for a specific implementation of the amplification processing, refer to step S515 shown in FIG. 9 subsequently.

Step S409: Obtain the switching instruction based on the front audio information and/or the back audio information after the amplification processing.

Optionally, the switching instruction is obtained based on energy of the amplitude spectrum of the front audio information and/or energy of the amplitude spectrum of the back audio information after the amplification processing.

In an example, if the energy of the amplitude spectrum of the front audio information after the amplification processing and the energy of the amplitude spectrum of the back audio information after the amplification processing are both less than a first preset threshold, it is considered that there is no audio data in either of the front direction and the back direction of the electronic device, and the electronic device keeps video recording by using a default camera. For example, the switching instruction may correspond to an identifier 0.

In an example, if only one of the energy of the amplitude spectrum of the front audio information after the amplification processing and the energy of the amplitude spectrum of the back audio information after the amplification processing is greater than a second preset threshold, the electronic device determines that a direction corresponding to an amplitude spectrum whose energy is greater than a first preset threshold is a main sound source direction, and switches a camera of the electronic device to this direction. For example, the switching instruction may be to switch to a back camera, and the switching instruction may correspond to an identifier 1; or the switching instruction may be to switch to a front camera, and the switching instruction may correspond to an identifier 2.

In an example, if only one of the energy of the amplitude spectrum of the front audio information after the amplification processing and the energy of the amplitude spectrum of the back audio information after the amplification processing is greater than or equal to a second preset threshold, and the other is greater than or equal to a first preset threshold, where the second preset threshold is greater than the first preset threshold, the electronic device may determine that a direction corresponding to the amplitude spectrum whose energy is greater than the second preset threshold is a main sound source direction, and that a direction corresponding to the amplitude spectrum whose energy is greater than the first preset threshold is a second sound source direction. In this case, the electronic device may start a picture-in-picture recording mode, use a picture in the direction corresponding to the amplitude spectrum whose energy is greater than or equal to the second preset threshold as a main picture, and use a picture in the direction corresponding to the amplitude spectrum whose energy is greater than or equal to the first preset threshold as a sub-picture.

For example, if the energy of the amplitude spectrum corresponding to the front audio information is greater than or equal to the second preset threshold, and the energy of the amplitude spectrum corresponding to the back audio information is greater than or equal to the first preset threshold, the switching instruction of the electronic device may be a picture-in-picture front main picture, and the switching instruction may correspond to an identifier 3.

For example, if the energy of the amplitude spectrum corresponding to the back audio information is greater than or equal to the second preset threshold, and the energy of the amplitude spectrum corresponding to the front audio information is greater than or equal to the first preset threshold, the switching instruction of the electronic device may be a picture-in-picture back main picture, and the switching instruction may correspond to an identifier 4.

In an example, if the energy of the amplitude spectrum of the front audio information after the amplification processing and the energy of the amplitude spectrum of the back audio information after the amplification processing are both greater than or equal to the second preset threshold, the electronic device may determine to enable dual-view recording, that is, to turn on a front camera and a back camera. Optionally, a picture captured by a camera corresponding to a direction with greater energy may be displayed on an upper or left side of a display.

For example, if the energy of the amplitude spectrum corresponding to the front audio information and the energy of the amplitude spectrum corresponding to the back audio information are both greater than or equal to the second preset threshold, and the energy of the amplitude spectrum corresponding to the front audio information is greater than the energy of the amplitude spectrum corresponding to the back audio information, the switching instruction of the electronic device may be front/back dual-view recording, a picture captured by a front camera of the electronic device is displayed on the upper or left side of the display, and the switching instruction may correspond to an identifier 5.

For example, if the energy of the amplitude spectrum corresponding to the front audio information and the energy of the amplitude spectrum corresponding to the back audio information are both greater than or equal to the second preset threshold, and the energy of the amplitude spectrum corresponding to the back audio information is greater than the energy of the amplitude spectrum corresponding to the front audio information, the switching instruction of the electronic device may be back/front dual-view recording, a picture captured by a back camera of the electronic device is displayed on the upper or left side of the display, and the switching instruction may correspond to an identifier 6.

Step S410: Execute the switching instruction.

For example, the electronic device may obtain the switching instruction based on the amplitude spectrum of the front audio information after the amplification processing and/or the amplitude spectrum of the back audio information after the amplification processing, and automatically execute the switching instruction, that is, the electronic device can automatically switch a camera of the electronic device based on the switching instruction without requiring the user to manually switch the camera application program.

In this embodiment of this application, in a video shooting scenario, the switching instruction may be obtained based on the audio data in a shooting environment, so that the electronic device can automatically determine whether to switch the camera or whether to enable multi-camera video recording, or the like. In this way, one-take video recording experience is achieved without requiring a manual user operation, and user experience is improved.

FIG. 9 is a schematic flowchart of a video processing method according to an embodiment of this application. The video processing method 500 may be performed by the electronic device shown in FIG. 1. The video processing method includes steps S501 to S515. The following describes steps S501 to S515 in detail separately.

It should be understood that the video processing method shown in FIG. 8 is described by using the electronic device including three pickup apparatuses as an example. Because the electronic device needs to determine directivity of audio information, in this embodiment of this application, the electronic device includes at least two pickup apparatuses, but there is no limitation on a specific quantity of pickup apparatuses.

Step S501: A pickup apparatus 1 captures audio data.
Step S502: A pickup apparatus 2 captures audio data.
Step S503: A pickup apparatus 3 captures audio data.

For example, the pickup apparatus 1, the pickup apparatus 2, and the pickup apparatus 3 may be located in different positions in an electronic device and configured to capture audio information in different directions. For example, the pickup apparatus 1, the pickup apparatus 2, or the pickup apparatus 3 may be a microphone.

Optionally, after the electronic device detects that a user selects a video recording mode, and video recording is enabled, the pickup apparatus 1, the pickup apparatus 2, and the pickup apparatus 3 may be started to capture audio data.

It should be understood that the foregoing steps S501 to S503 may be performed simultaneously.

Step S504: Blind signal separation.

Optionally, blind signal separation is performed on the audio data captured by the pickup apparatuses to obtain M pieces of audio information.

It should be understood that blind signal separation may also be referred to as blind source separation (blind signal/source separation, BSS) and means estimating source signals based on mixed signals in a case that the source signals and signal mixing parameters are unknown. In this embodiment of this application, audio information of different sources, that is, audio signals of different objects, may be obtained by performing blind signal separation on the captured audio data.

For example, a shooting environment in which the electronic device is located includes three users: a user A, a user B, and a user C. Audio information of the user A, the user B, and the user C in the audio data can be obtained through blind signal separation.

Step S505: Determine whether a switching instruction is included.

Optionally, whether the M pieces of audio information include the switching instruction is determined; and if the M pieces of audio information include the switching instruction, step S506 is performed; or if the M pieces of audio information do not include the switching instruction, steps S507 to S515 are performed.

For example, the M pieces of audio information may be obtained in step S504; and whether each audio signal in the M pieces of audio information includes the switching instruction is determined by recognizing the switching instruction in each audio signal in the M pieces of audio information, where the switching instruction may include but is not limited to: switching to a front camera, switching to a back camera, front video recording, back video recording, dual-view video recording, picture-in-picture video recording, or the like.

Figure 11:
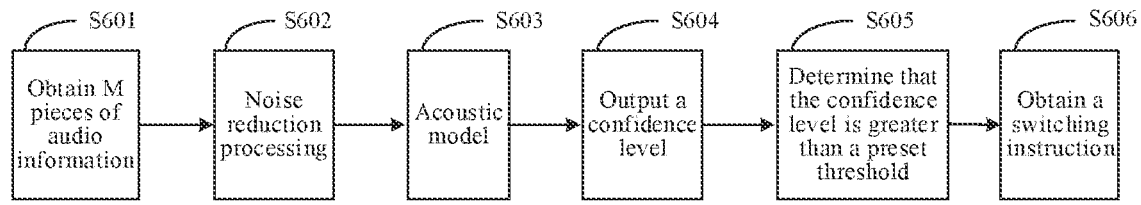
FIG. 11 is a schematic flowchart of a switching instruction recognition method according to an embodiment of this application.

Optionally, FIG. 11 is a schematic flowchart of a switching instruction recognition method according to an embodiment of this application. The recognition method 600 includes steps S601 to S606. The following describes steps S601 to S606 in detail separately.

Step S601: Obtain M pieces of audio information.

Optionally, M pieces of audio information after separation processing are obtained.

Optionally, step S601 may also be obtaining audio data captured by pickup apparatuses, for example, step S401 shown in FIG. 8.

Step S602: Noise reduction processing.

Optionally, noise reduction processing is performed on the M pieces of audio information separately.

For example, any noise reduction processing algorithm may be used for noise reduction processing. For example, the noise reduction processing algorithm may include a spectral subtraction method or a Wiener filtering algorithm, where a principle of the spectral subtraction method is to subtract a frequency spectrum of a noise signal from a frequency spectrum of a noisy signal to obtain a frequency spectrum of a clean signal, and a principle of the Wiener filtering algorithm is to make a noisy signal approximate to an original signal by performing a linear filter transform on the noisy signal, and find a linear filter parameter with a minimum mean square error.

Step S603: Acoustic model.

Optionally, the M pieces of audio information after noise reduction processing are respectively input into the acoustic model, where the acoustic model is a pre-trained deep neural network.

Step S604: Output a confidence level.

Optionally, a confidence level is output for each of the M pieces of audio information, and the confidence level is used to indicate a confidence level of one piece of audio information including a switching instruction.

Step S605: Determine that the confidence level is greater than a preset threshold.

Optionally, the confidence level is compared with the preset threshold; and when the confidence level is greater than the preset threshold, step S606 is performed.

Step S606: Obtain the switching instruction.

It should be understood that the foregoing steps S601 to S606 are examples for description. It is also possible to use another recognition method to recognize whether the audio information includes the switching instruction. This is not limited in this application.

Step S506: Execute the switching instruction.

For example, based on the switching instruction recognized in step S505, the electronic device automatically executes the switching instruction.

It should be understood that, that the electronic device automatically executes the switching instruction may be that the electronic device can automatically switch a camera of the electronic device based on the switching instruction without requiring the user to manually switch a camera application program.

It should be understood that steps S507 to S509 are used to output directivity of the M pieces of audio information, that is, to determine a front audio signal and a back audio signal in the M pieces of audio information, where the front audio signal may be an audio signal within a preset angle range of the front camera of the electronic device, and the back audio signal may be an audio signal within a preset angle range of the back camera of the electronic device.

Step S507: Calculate a sound direction probability.

Optionally, in a case that the M pieces of audio information do not include the switching instruction, the sound direction probability is calculated for the M pieces of audio information.

For example, based on a cACGMM and the audio data captured by the three pickup apparatuses, a probability value of a frequency of the current input audio data in each direction can be calculated.

It should be understood that the cACGMM is a Gaussian mixture model. The Gaussian mixture model is a model formed based on a Gaussian probability density function (such as a normal distribution curve) by accurately quantizing a thing and decomposing the thing into several by using the Gaussian probability density function (such as the normal distribution curve).

For example, the probability value of the frequency of the audio data in each direction meets the following constraint:

$$\sum_{k=1}^{K} P_k(t, f) = 1, 1 \le k \le K,$$

where $P_k(t, f)$ indicates a probability value in a k direction, t indicates a speech frame (for example, a frame of audio data), and f indicates a frequency (for example, a frequency angle of a frame of audio data).

It should be understood that in this embodiment of this application, the frequency may refer to a time-frequency; and the time-frequency may include time information, frequency range information, and energy information corresponding to the audio data.

For example, K may be 36 in this embodiment of this application. Because a circumference of the electronic device is 360 degrees and K is 36, every 10 degrees can be set as one direction.

It should be understood that the foregoing constraint may mean that a sum of probabilities of a frequency in all directions is 1.

Step S508: Spatial clustering.

It should be understood that in this embodiment of this application, a probability value of the audio data within an angle-of-view range of the camera of the electronic device can be determined through spatial clustering.

For example, a direction directly in front of a screen of the electronic device is usually a direction of 0 degrees. To ensure that the audio data in the camera of the electronic device is not lost, as shown in FIG. 10, a target angle in a front direction may be set to [−30, 30]; a target angle in a back direction of the electronic device may be set to [150, 210]; and corresponding angle direction indexes are respectively k1-k2, and a spatial clustering probability is:

$$P(t, f) = \sum_{k=k1}^{k2} P_k(t, f),$$

where P(t, f) indicates a probability of the frequency of the audio data at the target angle, and $P_k$(t, f) indicates the probability value of the frequency of the audio data in the k direction.

Step S509: Gain calculation.

For example, $$g_{mask}(t, f) = \begin{Bmatrix} 1, \text{ if } P(t,h) > P_{th1} \\ g_{mask-min}, \text{ if } P(t,h) \le P_{th2} \end{Bmatrix},$$

where $g_{mask}$ (t, f) indicates a frequency gain of the audio data, $P_{th1}$ indicates a first probability threshold, $P_{th2}$ indicates a second probability threshold, and $g_{mask-min}$ indicates a frequency gain of the audio data at a non-target angle.

It should be understood that when the probability of the frequency of the audio data at the target angle is greater than the first probability threshold, it may indicate that the frequency is within a target angle range; or when the probability of the frequency of the audio data at the target angle is less than or equal to the second probability threshold, it may indicate that the frequency is within a non-target angle range. For example, the first probability threshold may be 0.8; the frequency gain of the audio data at the non-target angle may be a preconfigured parameter, for example, 0.2; and the second probability threshold may be 0.1.

It should also be understood that smoothing processing on the audio data can be implemented by performing the foregoing gain calculation on the audio data, so that the frequency of the audio data within the target angle range is enhanced, and that the frequency of the audio data within the non-target angle range is weakened.

Step S510: Back voice beam.

Optionally, a back voice beam, that is, back audio data, can be obtained based on the frequency gain and Fourier transform processing of the audio data.

For example, as shown in FIG. 10, the back audio data may be audio data in the back direction of the electronic device; and the target angle in the back direction of the electronic device may be [150, 210].

For example, $y_{back}(t, f) = g_{back-mask}(t, f) * x_{back}(t, f)$, where $y_{back}(t, f)$ may indicate the back audio data, $g_{back-mask}(t, f)$ indicates a frequency gain of the back audio data, and $x_{back}(t, f)$ indicates a Fourier transform of the back audio data.

Step S511: Voice activity detection.

Optionally, voice activity detection is performed on the back voice beam (for example, the back audio data).

For example, semantic detection may be performed on the back audio data by using a cepstrum algorithm, to obtain a voice activity detection result; and if a fundamental frequency is detected, it is determined that the back voice beam includes audio information of the user; or if no fundamental frequency is detected, it is determined that the back voice beam does not include voice information of the user.

It should be noted that the back audio data is audio data captured by the electronic device within the angle range in the back direction; the back audio data may include audio information (for example, whistling of a vehicle) in the shooting environment, or voice information of the user; a purpose of performing voice detection on the back audio data is to determine whether the back voice data includes the voice information of the user; and when the back voice data includes the voice information of the user, amplification processing may be performed on the back voice data when subsequent step S515 is performed, so that accuracy of obtaining the voice information of the user can be improved.

It should be understood that the cepstrum algorithm is a method in signal processing and signal detection. The cepstrum is a power spectrum of a logarithmic power spectrum of a signal. A principle for obtaining a speech by using the cepstrum is as follows: Because a voiced signal is periodically excited, the voiced signal is a periodic impulse on the cepstrum. Therefore, a pitch period can be obtained. Generally, a second impulse (a first impulse is envelope information) in a cepstrum waveform is considered as a fundamental frequency of an excitation source. The fundamental frequency is one of characteristics of the speech. If the fundamental frequency exists, it indicates that there is a speech in the current audio data.

Step S512: Front voice beam.

Optionally, a front voice beam, that is, front audio data, can be obtained based on the frequency gain of the audio data and energy of the audio data.

For example, as shown in FIG. 10, the front audio data may be audio data in the front direction of the electronic device; and the target angle in the front direction of the electronic device may be [−30, 30].

For example, $y_{front}(t, f) = g_{front-mask}(t, f) * x_{front}(t, f)$, where $y_{front}(t, f)$ may indicate the front voice beam, $g_{front-mask}(t, f)$ indicates a frequency gain of the front audio data, and $x_{front}(t, f)$ indicates a Fourier transform of the front audio data.

Step S513: Voice activity detection.

Optionally, voice activity detection is performed on the front voice beam (for example, the front audio data).

For example, semantic detection may be performed on the front audio data by using the cepstrum algorithm, to obtain a voice activity detection result; and if a fundamental frequency is detected, it is determined that the front voice beam includes audio information of the user; or if no fundamental frequency is detected, it is determined that the front voice beam does not include voice information of the user.

It should be noted that the front audio data is audio data captured by the electronic device within the angle range in the front direction; the front audio data may include audio information (for example, whistling of a vehicle) in the shooting environment, or voice information of the user; a purpose of performing voice detection on the front audio data is to determine whether the front voice data includes the voice information of the user; and when the front voice data includes the voice information of the user, amplification processing may be performed on the front voice data when subsequent step S515 is performed, so that accuracy of obtaining the voice information of the user can be improved.

Step S514: Direction-of-arrival estimation.

Optionally, a direction of arrival of audio data captured by a pickup apparatus is estimated.

It should be understood that, in this embodiment of this application, angle information corresponding to the audio data may be obtained by estimating the direction of arrival of the audio data captured by the pickup apparatus, to determine whether the audio data obtained by the pickup apparatus is within the target angle range, for example, determine whether the audio data is within the target angle range in the front direction of the electronic device or within the target angle range in the back direction.

For example, the direction of arrival of the audio data captured by the pickup apparatus may be estimated by using a location algorithm of high resolution spectral estimation (for example, estimating signal parameter via rotational invariance techniques (estimating signal parameter via rotational invariance techniques, ESPRIT)), a location algorithm of steered beamforming, or a location algorithm based on a time difference of arrival (time difference of arrival, TDOA).

The ESRT is an algorithm of rotational invariance techniques, and its principle is mainly to estimate signal parameters based on rotational invariance of a signal. A principle of a location algorithm of a steered beamforming method is to perform filtering and weighted summation on signals received by a microphone to form a beam, and search for a location of a sound source according to a rule, where the found location of the sound source is a real sound source direction when the microphone reaches maximum output power. The TDOA is used to indicate a time difference of a sound source arriving at different microphones in an electronic device.

In an example, the location algorithm of the TDOA may include a GCC-PHAT algorithm. The GCC-PHAT algorithm is used as an example to describe the direction-of-arrival estimation performed based on the audio data. As shown in FIG. 12, the pickup apparatus 1 and the pickup apparatus 2 capture audio data, and a distance between the pickup apparatus 1 and the pickup apparatus 2 is d. In this case, information of an angle between the audio data and the electronic device may be obtained based on the GCC-PHAT algorithm.

For example, an angle θ shown in FIG. 12 may be obtained based on the following formulas:

$$d\cos\theta = \underset{d}{\mathrm{argmax}}\left(IDFT\frac{x_a(t, f)[x_b(t, f)]^*}{|x_a(t, f)[x_b(t, f)]^*|}\right)$$

$$\theta = \arccos\left(\frac{d\cos\theta}{d}\right),$$

where the IDFT indicates an inverse operation of a discrete Fourier transform, $x_a(t, f)$ indicates frequency domain information obtained by performing the Fourier transform on the audio data captured by the pickup apparatus 1, $x_b(t, f)$ indicates frequency domain information obtained by performing the Fourier transform on the audio data captured by the pickup apparatus 2, arg indicates an argument (that is, an English abbreviation of an independent variable argument), and arg max indicates a value of a variable that enables the subsequent formula to reach a maximum value.

Step S515: Data analysis.

Optionally, data analysis may be performed on the front voice beam and the back voice beam based on the angle information obtained through direction-of-arrival estimation and the voice activity detection result to obtain the switching instruction.

For example, an average amplitude spectrum of the front voice beam and an average amplitude spectrum of the back voice beam are calculated separately; and when the voice activity detection result indicates that the front voice beam includes the audio information of the user, first amplification processing may be performed on the average amplitude spectrum of the front voice beam; or when the voice activity detection result indicates that the back voice beam includes the audio information of the user, first amplification processing may be performed on the average amplitude spectrum of the back voice beam. For example, an amplification coefficient of the first amplification processing is $\alpha(1<\alpha<2)$.

It should be understood that an amplitude spectrum obtained by averaging amplitude spectra of different frequencies in the front voice beam may be referred to as the average amplitude spectrum of the front beam; an amplitude spectrum obtained by averaging amplitude spectra of different frequencies in the back voice beam may be referred to as the average amplitude spectrum of the back beam; and performing data analysis based on the average amplitude spectrum of the front voice beam and/or the average amplitude spectrum of the back voice beam can improve accuracy of information in the front voice beam and/or the back voice beam.

Further, when it is determined based on the angle information obtained through direction-of-arrival estimation that the front voice beam is within the target angle range in the front direction, second amplification processing may be performed on the average amplitude spectrum of the front voice beam; or when it is determined based on the angle information obtained through direction-of-arrival estimation that the back voice beam is within the target angle range in the back direction, second amplification processing may be performed on the average amplitude spectrum of the back voice beam. For example, an amplification coefficient of the second amplification processing is $\beta(1<\beta<2)$. The amplitude spectrum of the front voice beam after the amplification processing and the amplitude spectrum of the back voice beam after the amplification processing are obtained.

It should be understood that in this embodiment of this application, a purpose of performing the amplification processing on the front voice beam or the back voice beam is to adjust accuracy of the amplitude spectrum; in addition, when the voice beam (for example, the front voice beam and/or the back voice beam) includes the audio information of the user, performing the amplification processing on the amplitude spectrum of the voice beam can improve accuracy of the obtained audio information of the user; and in a case that the accuracy of the amplitude spectrum and the audio information of the user is improved, the switching instruction in the voice beam can be accurately obtained.

For example, an amplitude spectrum corresponding to a frequency in the audio data can be calculated by using the following formula:

$$Mag(i) = \sqrt{X_{real}(i)^* X_{real}(i) + X_{image}(i)^* X_{image}(i)}$$

$$Magback = \frac{1}{K_i - K_{j-1}} \sum_{j=K_{i-1}}^{K_i} Mag(i),$$

where Mag(i) indicates an amplitude spectrum corresponding to an $i^{th}$ frequency, i indicates the $i^{th}$ frequency, K indicates a frequency range, and $K_{i-1}$-$K_i$ indicate a frequency range required for averaging; it should be understood that an average value of some frequencies can be obtained without averaging all frequencies.

For example, when the voice activity detection result indicates that the front voice beam includes the audio information of the user, and the front voice beam is within the target angle range in the front direction, the average amplitude spectrum of the front voice beam after the amplification processing is:

$$MagFront = MagFront_1 * \alpha * \beta,$$

where MagFront indicates the average amplitude spectrum of the front voice beam after the amplification processing, $MagFront_1$ indicates an average amplitude spectrum of an original front voice beam, $\alpha$ indicates a preset first amplification coefficient, and $\beta$ indicates a preset second amplification coefficient.

It should be understood that the amplitude spectrum obtained by averaging the amplitude spectra of different frequencies in the front voice beam may be referred to as the average amplitude spectrum of the front beam.

For example, when the voice activity detection result indicates that the back voice beam includes the audio information of the user, and the back voice beam is within the target angle range in the back direction, the average amplitude spectrum of the back voice beam after the amplification processing is:

$$MagBack = MagBack_1 * \alpha * \beta,$$

where MagBack indicates the average amplitude spectrum of the back voice beam after the amplification processing, $MagBack_1$ indicates an average amplitude spectrum of an original back voice beam, $\alpha$ indicates a preset first amplification coefficient, and $\beta$ indicates a preset second amplification coefficient.

It should be understood that the amplitude spectrum obtained by averaging the amplitude spectra of different frequencies in the back voice beam may be referred to as the average amplitude spectrum of the back beam.

In an example, if energy of MagFront and energy of MagBack are both less than a first preset threshold, it is considered that there is no audio data in either of the front direction and the back direction of the electronic device. In this case, the electronic device keeps video recording by using a default camera. For example, as shown in Table 1, the switching instruction may correspond to an identifier 0.

In an example, if only one of energy of MagFront and energy of MagBack is greater than a second preset threshold, the electronic device determines that a direction corresponding to an amplitude spectrum whose energy is greater than a first preset threshold is a main sound source direction, and switches a camera of the electronic device to this direction. For example, as shown in Table 1, the switching instruction may be to switch to a back camera, and the switching instruction may correspond to an identifier 1; or the switching instruction may be to switch to a front camera, and the switching instruction may correspond to an identifier 2.

In an example, if only one of energy of MagFront and energy of MagBack is greater than or equal to a second preset threshold, and the other is greater than or equal to a first preset threshold, where the second preset threshold is greater than the first preset threshold, the electronic device may determine that a direction corresponding to the amplitude spectrum whose energy is greater than the second preset threshold is a main sound source direction, and that a direction corresponding to the amplitude spectrum whose energy is greater than the first preset threshold is a second sound source direction. In this case, the electronic device may start a picture-in-picture recording mode, use a picture in the direction corresponding to the amplitude spectrum whose energy is greater than or equal to the second preset threshold as a main picture, and use a picture in the direction corresponding to the amplitude spectrum whose energy is greater than or equal to the first preset threshold as a sub-picture.

For example, if the energy of MagFront is greater than or equal to the second preset threshold, and the energy of MagBack is greater than or equal to the first preset threshold, the switching instruction of the electronic device may be a picture-in-picture front main picture, and the switching instruction may correspond to an identifier 3.

For example, if the energy of the amplitude spectrum corresponding to the back voice beam is greater than or equal to the second preset threshold, and the energy of the amplitude spectrum corresponding to the front voice beam is greater than or equal to the first preset threshold, the switching instruction of the electronic device may be a picture-in-picture back main picture. For example, as shown in Table 1, the switching instruction may correspond to an identifier 4.

In an example, if the energy of MagFront and the energy of MagBack are both greater than or equal to the second preset threshold, the electronic device may determine to enable dual-view recording, that is, to turn on a front camera and a back camera. Optionally, a picture captured by a camera corresponding to a direction with greater energy may be displayed on an upper or left side of a display.

For example, if the energy of MagFrom and the energy of MagBack are both greater than or equal to the second preset threshold, and the energy of MagFront is greater than the energy of MagBack, the switching instruction of the electronic device may be front/back dual-view recording, and a picture captured by a front camera of the electronic device is displayed on the upper or left side of the display. For example, as shown in Table 1, the switching instruction may correspond to an identifier 5.

For example, if the energy of MagFront and the energy of MagBack are both greater than or equal to the second preset threshold, and the energy of MagBack is greater than the energy of MagFront, the switching instruction of the electronic device may be back/front dual-view recording, and a picture captured by a back camera of the electronic device is displayed on the upper or left side of the display. For example, as shown in Table 1, the switching instruction may correspond to an identifier 6.

TABLE 1

| Identifier | 0 | 1 | 2 | 3 | 4 | 5 | 6 |
|---|---|---|---|---|---|---|---|
| Shooting mode | Default | Back | Front | Picture-in-picture front main picture | Picture-in-picture back main picture | Front/Back dual-view | Back/Front dual-view |

It should be understood that the identifiers corresponding to a recording scenario are illustrated in Table 1. However, this is not limited in this application. In different recording scenarios, the electronic device can automatically switch different cameras in the electronic device.

For example, the electronic device may obtain the switching instruction based on the amplitude spectrum of the front audio information after the amplification processing and/or the amplitude spectrum of the back audio information after the amplification processing, and automatically execute the switching instruction, that is, the electronic device can automatically switch a camera of the electronic device based on the switching instruction without requiring the user to manually switch the camera application program.

In this embodiment of this application, in a video shooting scenario, the switching instruction may be obtained based on the audio data in the shooting environment, so that the electronic device can automatically determine whether to switch the camera or whether to enable multi-camera video recording, or the like. In this way, one-take video recording experience is achieved without requiring a manual user operation, and user experience is improved.

Figure 13:
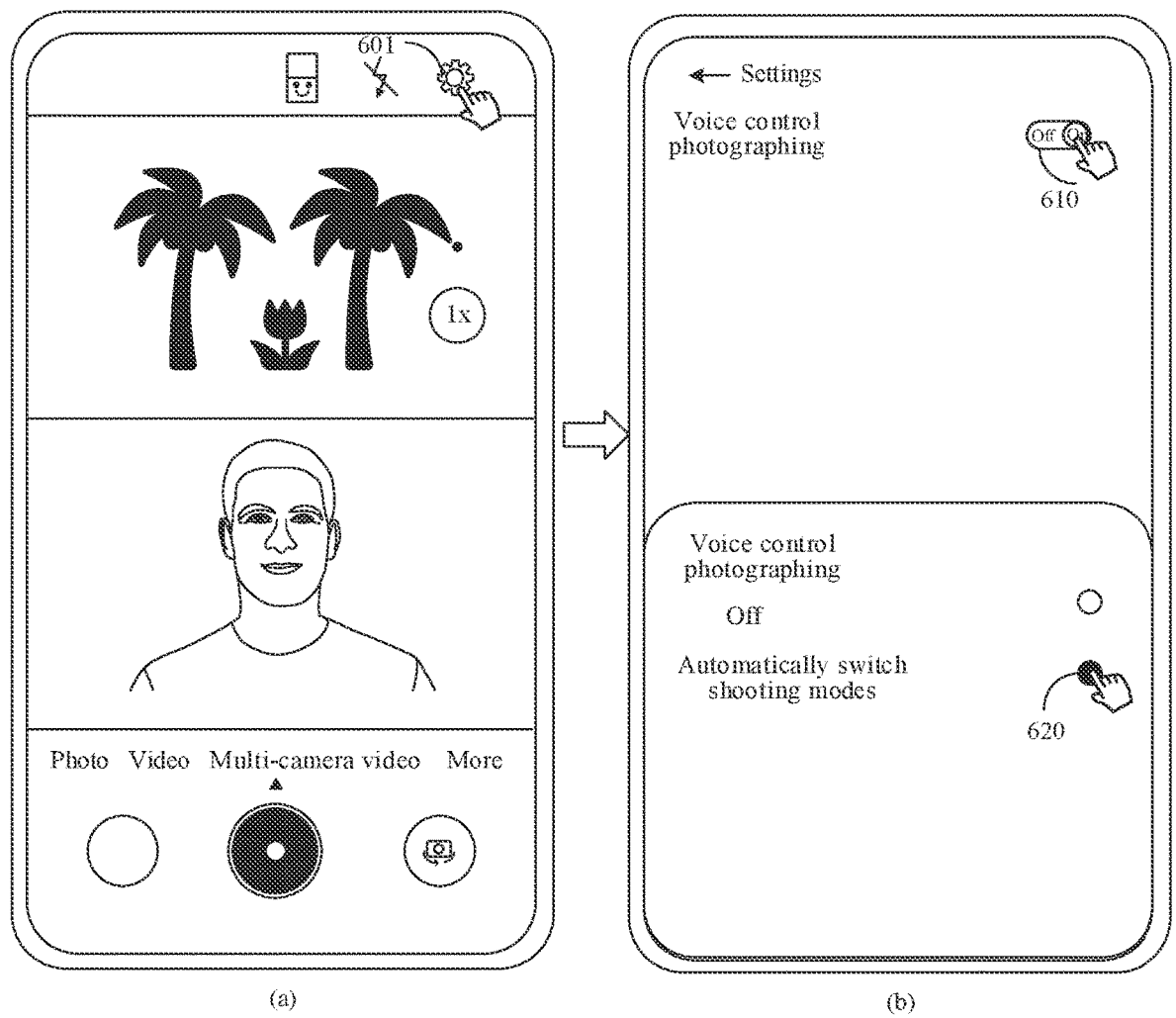
FIG. 13 is a schematic diagram of a graphical user interface to which an embodiment of this application is applicable.

FIG. 13 shows a graphical user interface (graphical user interface, GUI) of an electronic device.

As shown in (a) in FIG. 13, a preview screen of multi-camera video recording may include a control 601 for indicating settings. An operation of a user tapping the control 601 is detected, and a settings screen is displayed in response to the user operation, as shown in (b) in FIG. 13. The settings screen includes a voice control photographing control 610, and it is detected that the user enables voice control photographing. The voice control photographing includes a control 620 for automatically switching shooting modes. After detecting that the user taps the control 620 for automatically switching shooting modes, the electronic device can enable automatic switching of shooting modes of a camera application program, that is, a video processing method provided in an embodiment of this application can be performed. In a video shooting scenario, a switching instruction may be obtained based on audio data in a shooting environment, so that the electronic device can automatically determine whether to switch shooting modes. The electronic device completes video recording without requiring the user to switch shooting modes of the electronic device, thereby improving shooting experience of the user.

Figure 14:
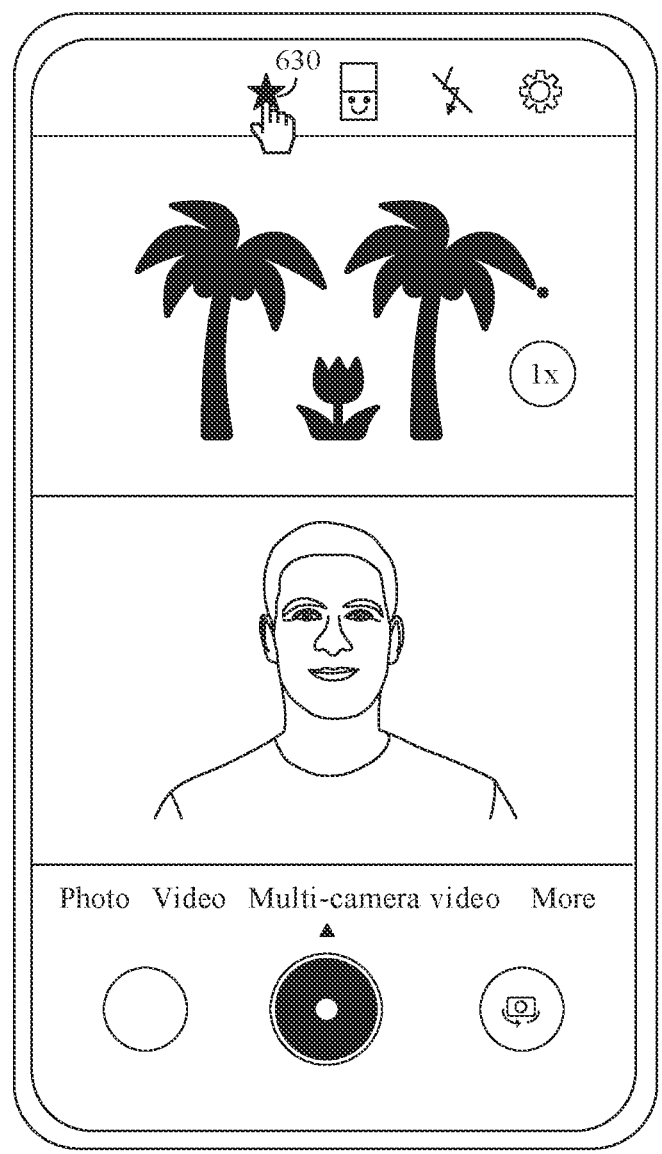
FIG. 14 is a schematic diagram of a graphical user interface to which an embodiment of this application is applicable.

In an example, as shown in FIG. 14, a preview screen of multi-camera video recording may include a control 630 for enabling automatic switching of shooting modes. After detecting that a user taps the control 630 for automatic switching of shooting modes, an electronic device can enable automatic switching of shooting modes of a camera application program, that is, a video processing method provided in an embodiment of this application can be performed. In a video shooting scenario, a switching instruction may be obtained based on audio data in a shooting environment, so that the electronic device can automatically determine whether to switch shooting modes. The electronic device completes video recording without requiring the user to switch shooting modes of the electronic device, thereby improving shooting experience of the user.

Figure 15:
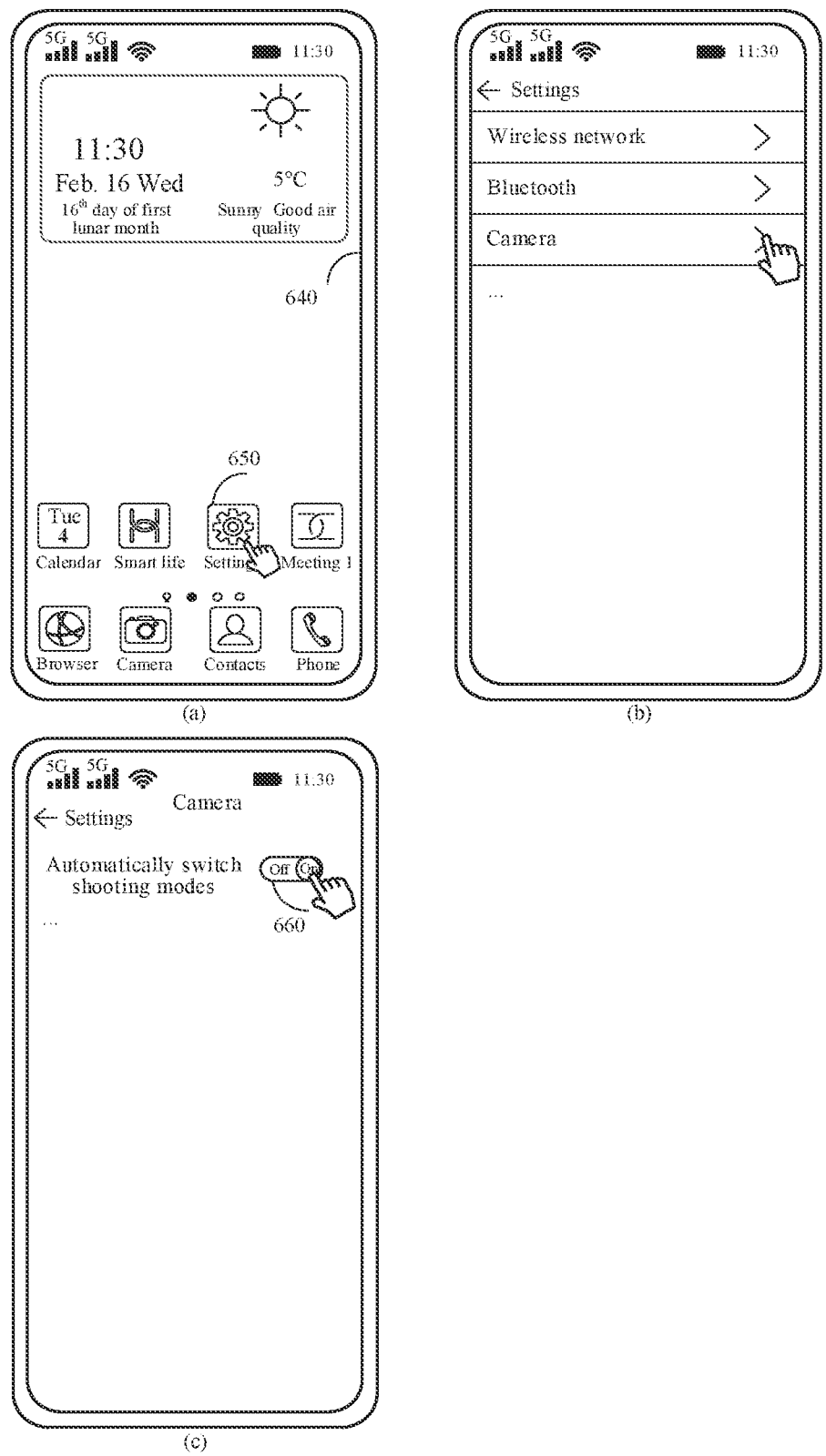
FIG. 15 is a schematic diagram of a graphical user interface to which an embodiment of this application is applicable.

FIG. 15 shows a graphical user interface (graphical user interface, GUI) of an electronic device.

The GUI shown in (a) in FIG. 15 is a home screen 640 of the electronic device. After the electronic device detects that a user taps a settings icon 650 on the home screen 640, the electronic device may display another GUI shown in (b) in FIG. 15. The GUI shown in (b) in FIG. 15 may be a display screen of settings, and the display screen of settings may include options such as wireless network, Bluetooth, or camera. After the camera option is tapped, a camera settings screen is displayed. The camera settings screen is shown as in (c) in FIG. 15. The camera settings screen may include a control 660 for automatically switching shooting modes. After detecting that the user taps the control 660 for automatically switching shooting modes, the electronic device can enable automatic switching of shooting modes of a camera application program, that is, a video processing method provided in an embodiment of this application can be performed. In a video shooting scenario, a switching instruction may be obtained based on audio data in a shooting environment, so that the electronic device can automatically determine whether to switch shooting modes. The electronic device completes video recording without requiring the user to switch shooting modes of the electronic device, thereby improving shooting experience of the user.

It should be understood that the foregoing examples are intended to help a person skilled in the art understand the embodiments of this application, and not intended to limit the embodiments of this application to specific values or specific scenarios that are illustrated. Apparently, a person skilled in the art can make various equivalent modifications or changes based on the foregoing examples, and such modifications or changes shall also fall within the scope of the embodiments of this application.

The video processing methods provided in the embodiments of this application are described in detail above with reference to FIG. 1 to FIG. 15. The following describes apparatus embodiments of this application in detail with reference to FIG. 16 and FIG. 17. It should be understood that the apparatuses in the embodiments of this application can perform various methods in the foregoing embodiments of this application. In other words, for specific working processes of the following products, refer to the corresponding processes of the foregoing method embodiments.

Figure 16:
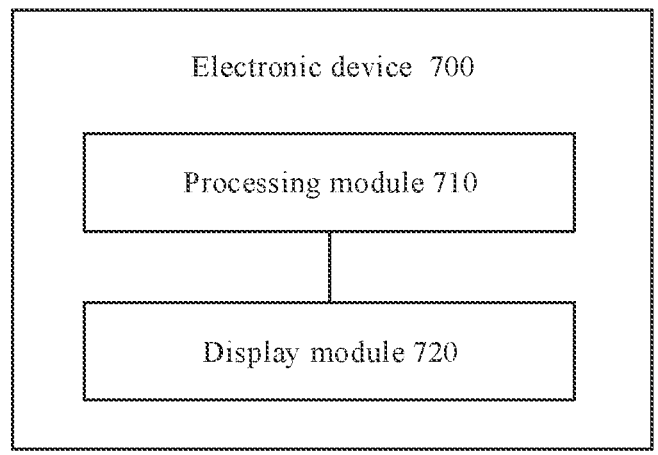
FIG. 16 is a schematic diagram of a structure of an electronic device according to an embodiment of this application.

FIG. 16 is a schematic diagram of a structure of an electronic device according to an embodiment of this application. The electronic device 700 includes a processing module 710 and a display module 720. The electronic device 700 may further include at least two pickup apparatuses, for example, at least two microphones.

The processing module 710 is configured to start a camera application program on the electronic device. The display module 720 is configured to display a first image, where the first image is an image captured when the electronic device is in a first shooting mode. The processing module 710 is further configured to obtain audio data, where the audio data is data captured by the at least two pickup apparatuses; and obtain a switching instruction based on the audio data, where the switching instruction is used to instruct the electronic device to switch from the first shooting mode to a second shooting mode. The display module 720 is further configured to display a second image, where the second image is an image captured when the electronic device is in the second shooting mode.

Optionally, in an embodiment, the electronic device includes a first camera and a second camera, the first camera and the second camera are located in different directions of the electronic device, and the processing module 710 is specifically configured to:

recognize whether the audio data includes a target keyword, where the target keyword is text information corresponding to the switching instruction;

in a case that the target keyword is recognized in the audio data, obtain the switching instruction based on the target keyword;

in a case that the target keyword is not recognized in the audio data, process the audio data to obtain audio data in a first direction and/or audio data in a second direction, where the first direction is used to indicate a first preset angle range corresponding to the first camera, and the second direction is used to indicate a second preset angle range corresponding to the second camera; and obtain the switching instruction based on the audio data in the first direction and/or the audio data in the second direction.

Optionally, in an embodiment, the processing module 710 is specifically configured to:

process the audio data based on a sound direction probability calculation algorithm to obtain the audio data in the first direction and/or the audio data in the second direction.

Optionally, in an embodiment, the processing module 710 is specifically configured to:

obtain the switching instruction based on energy of a first amplitude spectrum and/or energy of a second amplitude spectrum, where the first amplitude spectrum is an amplitude spectrum of the audio data in the first direction, and the second amplitude spectrum is an amplitude spectrum of the audio data in the second direction.

Optionally, in an embodiment, the switching instruction includes a current shooting mode, a first picture-in-picture mode, a second picture-in-picture mode, a first dual-view mode, a second dual-view mode, a single-shooting mode of the first camera, or a single-shooting mode of the second camera, and the processing module 710 is specifically configured to:

if the energy of the first amplitude spectrum and the energy of the second amplitude spectrum are both less than a first preset threshold, the obtained switching instruction is to maintain the current shooting mode;

if the energy of the first amplitude spectrum is greater than a second preset threshold, and the energy of the second amplitude spectrum is less than or equal to the second preset threshold, the switching instruction is to switch to the single-shooting mode of the first camera;

if the energy of the second amplitude spectrum is greater than a second preset threshold, and the energy of the first amplitude spectrum is less than or equal to the second preset threshold, the switching instruction is to switch to the single-shooting mode of the second camera;

if the energy of the first amplitude spectrum is greater than a second preset threshold, and the energy of the second amplitude spectrum is greater than or equal to a first preset threshold, the switching instruction is to switch to the first picture-in-picture mode;

if the energy of the second amplitude spectrum is greater than a second preset threshold, and the energy of the first amplitude spectrum is greater than or equal to a first preset threshold, the switching instruction is to switch to the second picture-in-picture mode;

if the energy of the first amplitude spectrum and the energy of the second amplitude spectrum are both greater than or equal to a second preset threshold, and the energy of the first amplitude spectrum is greater than the energy of the second amplitude spectrum, the switching instruction is to switch to the first dual-view mode; or if the energy of the first amplitude spectrum and the energy of the second amplitude spectrum are both greater than or equal to a second preset threshold, and the energy of the second amplitude spectrum is greater than the energy of the first amplitude spectrum, the switching instruction is to switch to the second dual-view mode, where the second preset threshold is greater than the first preset threshold, the first picture-in-picture mode is a shooting mode in which an image captured by the first camera is a main picture, the second picture-in-picture mode is a shooting mode in which an image captured by the second camera is a main picture, the first dual-view mode is a shooting mode in which the image captured by the first camera is located on an upper or left side of a display of the electronic device, and the second dual-view mode is a shooting mode in which the image captured by the second camera is located on the upper or left side of the display of the electronic device.

Optionally, in an embodiment, the first amplitude spectrum is a first average amplitude spectrum obtained by averaging amplitude spectra corresponding to all frequencies in the audio data in the first direction; and/or the second amplitude spectrum is a second average amplitude spectrum obtained by averaging amplitude spectra corresponding to all frequencies in the audio data in the second direction.

Optionally, in an embodiment, the first amplitude spectrum is an amplitude spectrum obtained after first amplification processing and/or second amplification processing are/is performed on a first average amplitude spectrum, and the first average amplitude spectrum is obtained by averaging amplitude spectra corresponding to all frequencies in the audio data in the first direction.

Optionally, in an embodiment, the processing module 710 is specifically configured to:

perform voice detection on the audio data in the first direction to obtain a first detection result;

estimate a direction of arrival of the data captured by the at least two pickup apparatuses to obtain angle prediction information; and if the first detection result indicates that the audio data in the first direction includes audio information of a user, perform the first amplification processing on the amplitude spectrum of the audio data in the first direction; and/or if the angle prediction information includes angle information within the first preset angle range, perform the second amplification processing on the amplitude spectrum of the audio data in the first direction.

Optionally, in an embodiment, the second amplitude spectrum is an amplitude spectrum obtained after first amplification processing and/or second amplification processing are/is performed on a second average amplitude spectrum, and the second average amplitude spectrum is obtained by averaging amplitude spectra corresponding to all frequencies in the audio data in the second direction.

Optionally, in an embodiment, the processing module 710 is specifically configured to:

perform voice detection on the audio data in the second direction to obtain a second detection result;

estimate a direction of arrival of the data captured by the at least two pickup apparatuses to obtain angle prediction information; and if the second detection result indicates that the audio data in the second direction includes audio information of a user, perform the first amplification processing on the amplitude spectrum of the audio data in the second direction; and/or if the angle prediction information includes angle information within the second preset angle range, perform the second amplification processing on the amplitude spectrum of the audio data in the second direction.

Optionally, in an embodiment, the processing module 710 is specifically configured to:

perform separation processing on the audio data based on a blind signal separation algorithm to obtain N pieces of audio information, where the N pieces of audio information are audio information of different users; and recognize each of the N pieces of audio information to determine whether the N pieces of audio information include the target keyword.

Optionally, in an embodiment, the first image is a preview image captured when the electronic device is in multi-camera video recording.

Optionally, in an embodiment, the first image is a video picture captured when the electronic device is in multi-camera video recording.

Optionally, in an embodiment, the audio data is data captured by the pickup apparatuses in a shooting environment in which the electronic device is located.

It should be noted that the electronic device 700 is embodied in a form of functional modules. The term "module" herein may be implemented in a form of software and/or hardware. This is not specifically limited.

For example, a "module" may be a software program, a hardware circuit, or a combination thereof for implementing the foregoing functions. The hardware circuit may include an application specific integrated circuit (application specific integrated circuit. ASIC), an electronic circuit, a processor for executing one or more software or firmware programs (such as a shared processor, a proprietary processor, or a group processor), a memory, a combinational logic circuit, and/or any other suitable component that supports the described functions.

Therefore, units in each example described in this embodiment of this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

Figure 17:
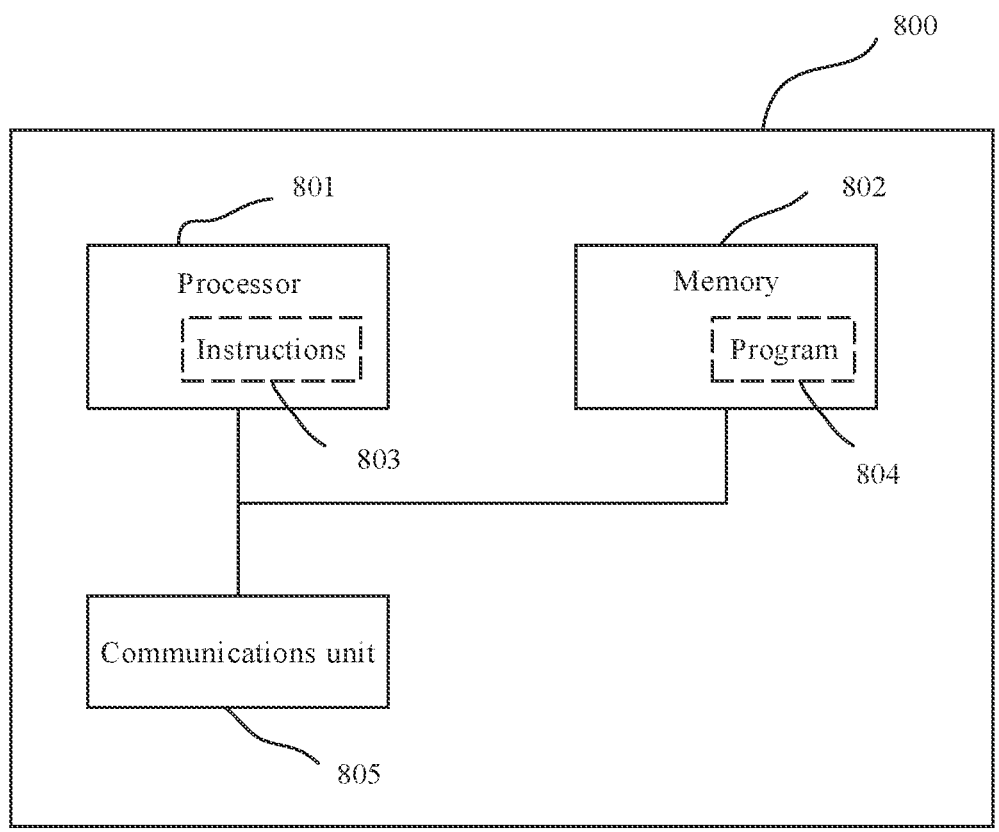
FIG. 17 is a schematic diagram of a structure of an electronic device according to an embodiment of this application.

FIG. 17 is a schematic diagram of a structure of an electronic device according to this application. A dashed line in FIG. 17 indicates that the unit or module is optional. The electronic device 800 may be configured to implement the methods described in the foregoing method embodiments.

The electronic device 800 includes one or more processors 801, and the one or more processors 801 can support the electronic device 800 in implementing the video processing methods in the method embodiments. The processor 801 may be a general-purpose processor or a dedicated processor. For example, the processor 801 may be a central processing unit (central processing unit, CPU), a digital signal processor (digital signal processor, DSP), an application specific integrated circuit (application specific integrated circuit, ASIC), a field programmable gate array (field programmable gate array, FPGA), or another programmable logic device, such as a discrete gate, a transistor logic device, or a discrete hardware component.

The processor 801 may be configured to control the electronic device 800, execute a software program, and process data of the software program. The electronic device 800 may further include a communications unit 805 configured to implement inputting (receiving) and outputting (sending) of signals.

For example, the electronic device 800 may be a chip, and the communications unit 805 may be an input and/or output circuit of the chip, or the communications unit 805 may be a communications interface of the chip. The chip may be used as a component of a terminal device or other electronic device.

For another example, the electronic device 800 may be a terminal device, and the communications unit 805 may be a transceiver of the terminal device, or the communications unit 805 may be a transceiver circuit of the terminal device.

The electronic device 800 may include one or more memories 802, where the memory stores a program 804. The program 804 can be run by the processor 801 to generate instructions 803, so that the processor 801 performs the video processing methods in the foregoing method embodiments according to the instructions 803.

Optionally, the memory 802 may further store data.

Optionally, the processor 801 may further read the data stored in the memory 802, where the data may be stored at a same storage address as the program 804, or stored at a storage address different from a storage address of the program 804.

The processor 801 and memory 802 may be disposed separately or integrated together, for example, integrated on a system-on-chip (system on chip, SOC) of the terminal device.

For example, the memory 802 may be configured to store the program 804 related to a video processing method provided in an embodiment of this application. When performing the video processing method, the processor 801 may be configured to invoke the program 804 related to the video processing method and stored in the memory 802, and perform the video processing method in the embodiment of this application, for example, starting a camera application program on the electronic device; displaying a first image, where the first image is an image captured when the electronic device is in a first shooting mode; obtaining audio data, where the audio data is data captured by at least two pickup apparatuses in the electronic device; obtaining a switching instruction based on the audio data, where the switching instruction is used to instruct the electronic device to switch from the first shooting mode to a second shooting mode; and displaying a second image, where the second image is an image captured when the electronic device is in the second shooting mode.

The application further provides a computer program product. When the computer program product is executed by the processor 801, the video processing method in any method embodiment of this application is implemented.

The computer program product may be stored in the memory 802, for example, is the program 804. The program 804 undergoes preprocessing, compiling, assembling, linking, and other processing, and is finally converted into an executable object file that can be executed by the processor 801.

This application further provides a computer-readable storage medium. The computer-readable storage medium stores a computer program, and when the computer program is executed by a computer, the video processing method in any method embodiment of this application is implemented. The computer program may be a high-level language program or an executable object program.

The computer-readable storage medium is, for example, the memory 802. The memory 802 may be a volatile memory or a non-volatile memory, or the memory 802 may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), and an electrically erasable programmable read-only memory (electrically EPROM, EEPROM), or a flash memory. The volatile memory may be a random access memory (random access memory, RAM), which is used as an external cache. For illustrative rather than restrictive description, a plurality of forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person of ordinary skill in the art may be easily aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described electronic device embodiments are merely examples. For example, the module division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communications connections through some interfaces, apparatuses or units, and may be implemented in electrical, mechanical, or other forms.

The units described as separate parts may or may not be physically separate and parts displayed as units may or may not be physical units, meaning that they may be located in one position or distributed on a plurality of network elements. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

It should be understood that sequence numbers of processes do not mean execution sequences in various embodiments of this application. The execution sequences of the processes should be determined based on functions and internal logic of the processes, and should not be construed as any limitation on implementation processes of the embodiments of this application.

In addition, the term "and/or" in this specification describes only an association relationship for describing associated objects and represents that three relationships may be present. For example, A and/or B may represent the presence of the following three cases: only A, both A and B, and only B. In addition, the character "/" in this specification generally indicates an "or" relationship between contextually associated objects.

When the functions are implemented in a form of a software functional unit and sold or used as a separate product, the functions may be stored in a computer-readable storage medium. Based on such an understanding, the technical solutions of this application substantially or parts making contributions to the conventional art or part of the technical solutions may be embodied in a form of a software product, and the computer software product is stored in a storage medium, including a plurality of instructions configured to enable a computer device (which may be a personal computer, a server, a network device or the like) to execute all or a part of the steps of the method in each embodiment of the application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims. The foregoing descriptions are merely preferred embodiments of the technical solutions of this application and not intended to limit the protection scope of this application. Any modification, equivalent replacement, and improvement made without departing from the spirit and principle of this application shall fall within the protection scope of this application.

What is claimed is:

1. A video processing method, applied to an electronic device, wherein the electronic device comprises a first camera, a second camera, and at least two pickup apparatuses, the first camera and the second camera are located in different directions of the electronic device, and the video processing method comprises:
running a camera application program on the electronic device;
displaying a first image, wherein the first image is an image captured when the electronic device is in a first shooting mode;
obtaining audio data, wherein the audio data is data captured by the at least two pickup apparatuses;
in a case that a target keyword is recognized in the audio data, obtaining a switching instruction based on the target keyword;
in a case that the target keyword is not recognized in the audio data, processing the audio data to obtain audio data in a first direction and/or audio data in a second direction, wherein the first direction is used to indicate a first preset angle range corresponding to the first camera, and the second direction is used to indicate a second preset angle range corresponding to the second camera;
obtaining the switching instruction based on the audio data in the first direction and/or the audio data in the second direction; and
displaying a second image, wherein the second image is an image captured when the electronic device is in the second shooting mode.

2. The video processing method according to claim 1, wherein the processing the audio data to obtain audio data in a first direction and/or audio data in a second direction comprises:
processing the audio data based on a sound direction probability calculation algorithm to obtain the audio data in the first direction and/or the audio data in the second direction.

3. The video processing method according to 1, wherein the obtaining the switching instruction based on the audio data in the first direction and/or the audio data in the second direction comprises:
obtaining the switching instruction based on energy of a first amplitude spectrum and/or energy of a second amplitude spectrum, wherein the first amplitude spectrum is an amplitude spectrum of the audio data in the first direction, and the second amplitude spectrum is an amplitude spectrum of the audio data in the second direction.

4. The video processing method according to claim 3, wherein the switching instruction comprises a current shooting mode, a first picture-in-picture mode, a second picture-in-picture mode, a first dual-view mode, a second dual-view mode, a single-shooting mode of the first camera, or a single-shooting mode of the second camera, and
the obtaining the switching instruction based on energy of a first amplitude spectrum and/or energy of a second amplitude spectrum comprises:

if the energy of the first amplitude spectrum and the energy of the second amplitude spectrum are both less than a first preset threshold, the switching instruction is to maintain the current shooting mode;

if the energy of the first amplitude spectrum is greater than a second preset threshold, and the energy of the second amplitude spectrum is less than or equal to the second preset threshold, the switching instruction is to switch to the single-shooting mode of the first camera;

if the energy of the second amplitude spectrum is greater than a second preset threshold, and the energy of the first amplitude spectrum is less than or equal to the second preset threshold, the switching instruction is to switch to the single-shooting mode of the second camera;

if the energy of the first amplitude spectrum is greater than a second preset threshold, and the energy of the second amplitude spectrum is greater than or equal to a first preset threshold, the switching instruction is to switch to the first picture-in-picture mode;

if the energy of the second amplitude spectrum is greater than a second preset threshold, and the energy of the first amplitude spectrum is greater than or equal to a first preset threshold, the switching instruction is to switch to the second picture-in-picture mode;

if the energy of the first amplitude spectrum and the energy of the second amplitude spectrum are both greater than or equal to a second preset threshold, and the energy of the first amplitude spectrum is greater than the energy of the second amplitude spectrum, the switching instruction is to switch to the first dual-view mode; or p1 if the energy of the first amplitude spectrum and the energy of the second amplitude spectrum are both greater than or equal to a second preset threshold, and the energy of the second amplitude spectrum is greater than the energy of the first amplitude spectrum, the switching instruction is to switch to the second dual-view mode, wherein p1 the second preset threshold is greater than the first preset threshold, the first picture-in-picture mode is a shooting mode in which an image captured by the first camera is a main picture, the second picture-in-picture mode is a shooting mode in which an image captured by the second camera is a main picture, the first dual-view mode is a shooting mode in which the image captured by the first camera is located on an upper or left side of a display of the electronic device, and the second dual-view mode is a shooting mode in which the image captured by the second camera is located on the upper or left side of the display of the electronic device.

5. The video processing method according to claim 3, wherein the first amplitude spectrum is a first average amplitude spectrum obtained by averaging amplitude spectra corresponding to all frequencies in the audio data in the first direction; and/or p1 the second amplitude spectrum is a second average amplitude spectrum obtained by averaging amplitude spectra corresponding to all frequencies in the audio data in the second direction.

6. The video processing method according to claim 3, wherein the first amplitude spectrum is an amplitude spectrum obtained after first amplification processing and/or second amplification processing are/is performed on a first average amplitude spectrum, and the first average amplitude spectrum is obtained by averaging amplitude spectra corresponding to all frequencies in the audio data in the first direction;

the second amplitude spectrum is an amplitude spectrum obtained after first amplification processing and/or second amplification processing are/is performed on a second average amplitude spectrum, and the second average amplitude spectrum is obtained by averaging amplitude spectra corresponding to all frequencies in the audio data in the second direction.

7. The video processing method according to claim 6, wherein the video processing method further comprises:
performing voice detection on the audio data in the first direction to obtain a first detection result;
estimating a direction of arrival of the data captured by the at least two pickup apparatuses to obtain angle prediction information; and
if the first detection result indicates that the audio data in the first direction comprises audio information of a user, performing the first amplification processing on the amplitude spectrum of the audio data in the first direction; and/or
if the angle prediction information comprises angle information within the first preset angle range, performing the second amplification processing on the amplitude spectrum of the audio data in the first direction.

8. The video processing method according to claim 6, wherein the video processing method further comprises:
performing voice detection on the audio data in the second direction to obtain a second detection result;
estimating a direction of arrival of the data captured by the at least two pickup apparatuses to obtain angle prediction information; and
if the second detection result indicates that the audio data in the second direction comprises audio information of a user, performing the first amplification processing on the amplitude spectrum of the audio data in the second direction; and/or
if the angle prediction information comprises angle information within the second preset angle range, performing the second amplification processing on the amplitude spectrum of the audio data in the second direction.

9. The video processing method according to claim 1, wherein the video processing method further comprises:
performing separation processing on the audio data based on a blind signal separation algorithm to obtain N pieces of audio information, wherein the N pieces of audio information are audio information of different users; and
recognizing each of the N pieces of audio information to determine whether the N pieces of audio information comprise the target keyword.

10. The video processing method according to claim 1, wherein the first image is a preview image captured when the electronic device is in multi-camera video recording; or the first image is a video picture captured when the electronic device is in multi-camera video recording.

11. An electronic device, comprising:
a first camera;
a second camera, the first camera and the second camera are located in different directions of the electronic device;
at least two pickup apparatuses;
one or more processors and a memory, wherein
the memory is coupled to the one or more processors, the memory is configured to store computer program code, the computer program code comprises computer instructions, and the one or more processors invoke the computer instructions to enable the electronic device to perform the following steps:

running a camera application program on the electronic device;

displaying a first image, wherein the first image is an image captured when the electronic device is in a first shooting mode;

obtaining audio data, wherein the audio data is data captured by the at least two pickup apparatuses;

in a case that a target keyword is recognized in the audio data, obtaining a switching instruction based on the target keyword;

in a case that the target keyword is not recognized in the audio data, processing the audio data to obtain audio data in a first direction and/or audio data in a second direction, wherein the first direction is used to indicate a first preset angle range corresponding to the first camera, and the second direction is used to indicate a second preset angle range corresponding to the second camera;

obtaining the switching instruction based on the audio data in the first direction and/or the audio data in the second direction; and displaying a second image, wherein the second image is an image captured when the electronic device is in the second shooting mode.

12. The electronic device according to claim 11, wherein the processing the audio data to obtain audio data in a first direction and/or audio data in a second direction comprises:

processing the audio data based on a sound direction probability calculation algorithm to obtain the audio data in the first direction and/or the audio data in the second direction.

13. The electronic device according to claim 11, wherein the obtaining the switching instruction based on the audio data in the first direction and/or the audio data in the second direction comprises:

obtaining the switching instruction based on energy of a first amplitude spectrum and/or energy of a second amplitude spectrum, wherein the first amplitude spectrum is an amplitude spectrum of the audio data in the first direction, and the second amplitude spectrum is an amplitude spectrum of the audio data in the second direction.

14. The electronic device according to claim 13, wherein the switching instruction comprises a current shooting mode, a first picture-in-picture mode, a second picture-in-picture mode, a first dual-view mode, a second dual-view mode, a single-shooting mode of the first camera, or a single-shooting mode of the second camera, and the obtaining the switching instruction based on energy of a first amplitude spectrum and/or energy of a second amplitude spectrum comprises:

if the energy of the first amplitude spectrum and the energy of the second amplitude spectrum are both less than a first preset threshold, the switching instruction is to maintain the current shooting mode;

if the energy of the first amplitude spectrum is greater than a second preset threshold, and the energy of the second amplitude spectrum is less than or equal to the second preset threshold, the switching instruction is to switch to the single-shooting mode of the first camera;

if the energy of the second amplitude spectrum is greater than a second preset threshold, and the energy of the first amplitude spectrum is less than or equal to the second preset threshold, the switching instruction is to switch to the single-shooting mode of the second camera;

if the energy of the first amplitude spectrum is greater than a second preset threshold, and the energy of the second amplitude spectrum is greater than or equal to a first preset threshold, the switching instruction is to switch to the first picture-in-picture mode;

if the energy of the second amplitude spectrum is greater than a second preset threshold, and the energy of the first amplitude spectrum is greater than or equal to a first preset threshold, the switching instruction is to switch to the second picture-in-picture mode;

if the energy of the first amplitude spectrum and the energy of the second amplitude spectrum are both greater than or equal to a second preset threshold, and the energy of the first amplitude spectrum is greater than the energy of the second amplitude spectrum, the switching instruction is to switch to the first dual-view mode; or if the energy of the first amplitude spectrum and the energy of the second amplitude spectrum are both greater than or equal to a second preset threshold, and the energy of the second amplitude spectrum is greater than the energy of the first amplitude spectrum, the switching instruction is to switch to the second dual-view mode, wherein the second preset threshold is greater than the first preset threshold, the first picture-in-picture mode is a shooting mode in which an image captured by the first camera is a main picture, the second picture-in-picture mode is a shooting mode in which an image captured by the second camera is a main picture, the first dual-view mode is a shooting mode in which the image captured by the first camera is located on an upper or left side of a display of the electronic device, and the second dual-view mode is a shooting mode in which the image captured by the second camera is located on the upper or left side of the display of the electronic device.

15. The electronic device according to claim 13, wherein the first amplitude spectrum is an amplitude spectrum obtained after first amplification processing and/or second amplification processing are/is performed on a first average amplitude spectrum, and the first average amplitude spectrum is obtained by averaging amplitude spectra corresponding to all frequencies in the audio data in the first direction;

the second amplitude spectrum is an amplitude spectrum obtained after first amplification processing and/or second amplification processing are/is performed on a second average amplitude spectrum, and the second average amplitude spectrum is obtained by averaging amplitude spectra corresponding to all frequencies in the audio data in the second direction.

16. The electronic device according to claim 15, wherein the video processing method further comprises:

performing voice detection on the audio data in the first direction to obtain a first detection result;

estimating a direction of arrival of the data captured by the at least two pickup apparatuses to obtain angle prediction information; and if the first detection result indicates that the audio data in the first direction comprises audio information of a user, performing the first amplification processing on the amplitude spectrum of the audio data in the first direction; and/or if the angle prediction information comprises angle information within the first preset angle range, performing the second amplification processing on the amplitude spectrum of the audio data in the first direction.

17. The electronic device according to claim 15, wherein the video processing method further comprises:
- performing voice detection on the audio data in the second direction to obtain a second detection result;
- estimating a direction of arrival of the data captured by the at least two pickup apparatuses to obtain angle prediction information; and
- if the second detection result indicates that the audio data in the second direction comprises audio information of a user, performing the first amplification processing on the amplitude spectrum of the audio data in the second direction; and/or
- if the angle prediction information comprises angle information within the second preset angle range, performing the second amplification processing on the amplitude spectrum of the audio data in the second direction.

18. The electronic device according to claim 11, wherein the video processing method further comprises:
- performing separation processing on the audio data based on a blind signal separation algorithm to obtain N pieces of audio information, wherein the N pieces of audio information are audio information of different users; and
- recognizing each of the N pieces of audio information to determine whether the N pieces of audio information comprise the target keyword.

19. The electronic device according to claim 11, wherein the first image is a preview image captured when the electronic device is in multi-camera video recording; or the first image is a video picture captured when the electronic device is in multi-camera video recording.

20. A non-transitory computer-readable storage medium, wherein the computer-readable storage medium stores a computer program, and when the computer program is executed by a processor, an electronic device is enabled to perform the following steps:
- running a camera application program on the electronic device;
- displaying a first image, wherein the first image is an image captured when the electronic device is in a first shooting mode;
- obtaining audio data, wherein the audio data is data captured by the at least two pickup apparatuses;
- in a case that a target keyword is recognized in the audio data, obtaining a switching instruction based on the target keyword;
- in a case that the target keyword is not recognized in the audio data, processing the audio data to obtain audio data in a first direction and/or audio data in a second direction, wherein the first direction is used to indicate a first preset angle range corresponding to a first camera, and the second direction is used to indicate a second preset angle range corresponding to a second camera;
- obtaining the switching instruction based on the audio data in the first direction and/or the audio data in the second direction; and
- displaying a second image, wherein the second image is an image captured when the electronic device is in the second shooting mode.

* * * * *

UNITED STATES PATENT AND TRADEMARK OFFICE
CERTIFICATE OF CORRECTION

| | | |
|---|---|---|
| PATENT NO. | : 12,250,456 B2 | Page 1 of 1 |
| APPLICATION NO. | : 18/252907 | |
| DATED | : March 11, 2025 | |
| INVENTOR(S) | : Zhenyi Liu, Jianyong Xuan and Guozhi Cao | |

It is certified that error appears in the above-identified patent and that said Letters Patent is hereby corrected as shown below:

On the Title Page

In Column 1 (Item (73) Assignee), In Line 2, Delete "Shenzhen (CN)" and insert -- Beijing (CN) --.

In the Claims

In Column 49, In Line 33, In Claim 4, after "or" delete "p1".

In Column 49, In Line 39, In Claim 4, after "wherein" delete "p1".

In Column 49, In Line 56, In Claim 5, after "and/or" delete "p1".

Signed and Sealed this
Nineteenth Day of August, 2025

Coke Morgan Stewart
*Acting Director of the United States Patent and Trademark Office*